US008788793B2

(12) United States Patent
Morishita

(10) Patent No.: US 8,788,793 B2
(45) Date of Patent: Jul. 22, 2014

(54) INSTRUCTION ISSUE TO PLURAL COMPUTING UNITS FROM PLURAL STREAM BUFFERS BASED ON PRIORITY IN INSTRUCTION ORDER TABLE

(75) Inventor: Hiroyuki Morishita, Osaka (JP)

(73) Assignee: Panasonic Corporation, Osaka (JP)

( * ) Notice: Subject to any disclaimer, the term of this patent is extended or adjusted under 35 U.S.C. 154(b) by 441 days.

(21) Appl. No.: 13/320,668

(22) PCT Filed: May 18, 2010

(86) PCT No.: PCT/JP2010/003354
§ 371 (c)(1),
(2), (4) Date: Nov. 15, 2011

(87) PCT Pub. No.: WO2010/134329
PCT Pub. Date: Nov. 25, 2010

(65) Prior Publication Data
US 2012/0060017 A1 Mar. 8, 2012

(30) Foreign Application Priority Data

May 18, 2009 (JP) ................................. 2009-119508

(51) Int. Cl.
*G06F 9/30* (2006.01)
*G06F 9/38* (2006.01)

(52) U.S. Cl.
CPC .................................. *G06F 9/3851* (2013.01)
USPC ....................... 712/215; 712/214; 712/E9.053

(58) Field of Classification Search
CPC ... G06F 9/3851; G06F 9/3836; G06F 9/3885; G06F 9/3814; G06F 9/4881; G06F 12/0842; G06F 9/44
See application file for complete search history.

(56) References Cited

U.S. PATENT DOCUMENTS 5,430,851 A   7/1995  Hirata et al.
6,105,127 A   8/2000  Kimura et al.
(Continued)

FOREIGN PATENT DOCUMENTS

CN   101133391 A   2/2008
JP   10-124316     5/1998
(Continued)

OTHER PUBLICATIONS

Extended European Search Report issued Sep. 5, 2012 in corresponding European Application No. 10777567.8.

(Continued)

*Primary Examiner* — Kenneth Kim
(74) *Attorney, Agent, or Firm* — Wenderoth, Lind & Ponack, L.L.P.

(57) ABSTRACT

A processor including L computing units, L being an integer of 2 or greater, the processor comprising: an instruction buffer including M×Z instruction storage areas each storing one instruction, M instruction streams being input in a state of being distinguished from each other, each of the M instruction streams including Z instructions, M and Z each being an integer of 2 or greater, M×Z being equal to or greater than L; an order information holding unit holding order information that indicates an order of the M×Z instruction storage areas; an extraction unit operable to extract instructions from the M×Z instruction storage areas; and a control unit operable to cause the extraction unit to extract L instructions in executable state from the M×Z instruction storage areas in accordance with the order indicated by the order information, and input the instructions into different ones of the L computing units.

8 Claims, 20 Drawing Sheets

(56) References Cited

U.S. PATENT DOCUMENTS

| | | |
|---|---|---|
| 6,658,551 B1 | 12/2003 | Berenbaum et al. |
| 7,366,878 B1 | 4/2008 | Mills et al. |
| 7,418,576 B1 * | 8/2008 | Lindholm et al. ............ 712/214 |
| 7,518,993 B1 | 4/2009 | Dennis |
| 8,141,088 B2 * | 3/2012 | Morishita et al. ............ 718/103 |
| 2006/0095902 A1 | 5/2006 | Nakaike et al. |
| 2006/0179279 A1 | 8/2006 | Jones et al. |
| 2007/0101256 A1 | 5/2007 | Simonyi |
| 2009/0077351 A1 | 3/2009 | Nakaike et al. |

FOREIGN PATENT DOCUMENTS

| | | |
|---|---|---|
| JP | 2001-306324 | 11/2001 |
| JP | 2004-295195 | 10/2004 |
| JP | 2006-127302 | 5/2006 |
| JP | 2009-515264 | 4/2009 |
| WO | 00/36487 | 6/2000 |

OTHER PUBLICATIONS

Office Action issued Apr. 24, 2013 in corresponding European Application No. 10777567.8.

Office Action issued Sep. 22, 2013 in corresponding Chinese Application No. 201080021569.6, with partial English translation.

International Search Report issued Jun. 29, 2010 in corresponding International Application No. PCT/JP2010/003354.

Ron Kalla et al., "Simultaneous Multi-threading Implementation in Powers—IBM's Next Generation Power Microprocessor", A Symposium on High Performance Chips briefing paper, IBM Corporation, Aug. 19, 2003, pp. 1-15, http://www.hotchips.org/archives/hc15/3_Tue/11.ibm.pdf.

Hiroaki Hirata et al., "A Multithreaded Processor Architecture with Simultaneous Instruction Issuing", International Symposium on Supercomputing, Fukuoka, Japan, Nov. 1991, pp. 87-96.

* cited by examiner

FIG.4

| Priority | Instruction stream | Instruction number |
|---|---|---|
| 1 | 1 | 1 |
| 2 | 2 | 1 |
| 3 | 2 | 2 |
| 4 | 2 | 3 |
| 5 | 1 | 2 |
| ⋮ | ⋮ | ⋮ |
| 4*N | | |

FIG.9A

| Priority | Instruction stream | Instruction number in instruction stream |
|---|---|---|
| 1 | 1 | 1 |
| 2 | 2 | 1 |
| 3 | 2 | 2 |
| 4 | 2 | 3 |
| 5 | 1 | 2 |
| ⋮ | ⋮ | ⋮ |
| 4*N | | |

FIG.9B

| Priority | Instruction stream | Instruction number in instruction stream |
|---|---|---|
| 1 | 1 | 1 |
| 2 | 1 | 2 |
| 3 | 2 | 1 |
| 4 | 2 | 2 |
| 5 | 2 | 3 |
| ⋮ | ⋮ | ⋮ |
| 4*N | | |

FIG.15A

| Priority | Instruction stream | Instruction number in instruction stream |
|---|---|---|
| 1 | 1 | 1 |
| 2 | 2 | 1 |
| 3 | 2 | 2 |
| 4 | 2 | 3 |
| 5 | 1 | 2 |
| ⋮ | ⋮ | ⋮ |
| 4*N | | |

FIG.15B

| Priority | Instruction stream | Instruction number in instruction stream |
|---|---|---|
| 1 | 2 | 1 |
| 2 | 2 | 2 |
| 3 | 2 | 3 |
| 4 | 1 | 1 |
| 5 | 1 | 2 |
| ⋮ | ⋮ | ⋮ |
| 4*N | | |

: First instruction stream

: Second instruction stream

INSTRUCTION ISSUE TO PLURAL COMPUTING UNITS FROM PLURAL STREAM BUFFERS BASED ON PRIORITY IN INSTRUCTION ORDER TABLE

TECHNICAL FIELD

The present invention relates to a technology for realizing both of guaranteeing the performance of one instruction stream and providing another instruction stream with high responsiveness, in a processor that executes a plurality of instruction streams in parallel.

BACKGROUND ART

In recent years, attempts have been made to improve the efficiency in the media processing of compressing and decompressing digitized video and/or audio data. Non-Patent Literature 1 discloses a multithreaded processor which improves the computing efficiency by executing a plurality of programs simultaneously.

Also, Patent Literature 1 discloses a technology for using a multithreaded processor. According to the technology disclosed in Patent Literature 1, a plurality of instruction streams (threads) are assigned with respective priorities of processing, and the instruction streams are executed in the descending order of the priorities. This technology dynamically achieves the processing performance required in units of instruction streams, and improves the whole processing efficiency.

CITATION LIST

Patent Literature

[Patent Literature 1]
Japanese Patent Application Publication No. H10-124316
[Non-Patent Literature]
[Non-Patent Literature 1]
"A Multithreaded Processor Architecture with Simultaneous Instruction Issuing", In Proc. of ISS'91:International Symposium on Supercomputing, Fukuoka, Japan, pp. 87-96, November 1991

SUMMARY OF INVENTION

Technical Problem

Meanwhile, instruction streams to be executed include those that are required to complete the process within a predetermined time period, such as those to carry out the image processing (that is to say, instruction streams whose performance is required to be guaranteed), and include instruction streams that carry out the process specified by the user (that is to say, instruction streams that do not need to complete the process within a predetermined time period).

Suppose that these instruction streams are executed in parallel by using the technology disclosed in Patent Literature 1. Then for the performance-guarantee instruction streams (whose performance needs to be guaranteed) to be executed within a predetermined time period, it is necessary to assign higher priorities to the performance-guarantee instruction streams than to the other instruction streams (non-performance-guarantee instruction streams whose performance does not need to be guaranteed).

In that case, the performance-guarantee instruction streams are executed with priority, and the non-performance-guarantee instruction streams are not executed. Under these circumstances, if a user inputs an instruction to carry out a process, the process is not carried out until the performance-guarantee instruction streams have been executed. In that case, the user would feel the device is slow to respond to his/her instruction, and become uncomfortable.

Conversely, for the user-instructed process to be carried out before the other processes, the instruction stream to which the instruction for executing the user-instructed process belongs may be assigned with a higher priority than the other instruction streams (the performance-guarantee instruction streams whose performance needs to be guaranteed). In that case, however, the performance-guarantee instruction streams are not guaranteed to complete the process within the predetermined time period.

It is therefore an object of the present invention to provide a processor, an information processing system, and a method that realize both guaranteeing the performance of one instruction stream and providing another instruction stream with high responsiveness.

Solution to Problem

The above object is fulfilled by a processor including L computing units, L being an integer of 2 or greater, the processor comprising: an instruction buffer including M×Z instruction storage areas each storing one instruction, M instruction streams being input in a state of being distinguished from each other, each of the M instruction streams including Z instructions, M being an integer of 2 or greater, Z being an integer of 2 or greater, M×Z being equal to or greater than L; an order information holding unit holding order information that indicates an order of the M×Z instruction storage areas of the instruction buffer; an extraction unit operable to extract instructions from the M×Z instruction storage areas of the instruction buffer; and a control unit operable to cause the extraction unit to extract L instructions in executable state from the M×Z instruction storage areas in accordance with the order indicated by the order information held by the order information holding unit, and input the extracted L instructions into different ones of the L computing units.

Advantageous Effects of Invention

With the above structure in which the processor extracts L executable instructions from the M×Z instruction storage areas in accordance with the order information indicating the order of the M×Z instruction storage areas, it is possible to extract one or more instructions belonging to one instruction stream and one or more instructions belonging to another instruction stream simultaneously. Thus, when, for example, one instruction stream is a performance-guarantee instruction stream whose performance needs to be guaranteed and another instruction stream is a non-performance-guarantee instruction stream whose performance does not need to be guaranteed, execution of instructions of the other instruction stream does not need to wait until execution of instructions of the one instruction stream is completed. Accordingly, the processor of the present invention realizes both guaranteeing the performance of one instruction stream and providing another instruction stream with high responsiveness.

BRIEF DESCRIPTION OF DRAWINGS

FIG. 4 illustrates an example of the data structure of the priority information table 300.

FIG. 7 illustrates the structure of the processor 10a.

FIG. 9A illustrates an example of the data structure of the priority information table 800 before update. FIG. 9B illustrates an example of the data structure of the priority information table 800a after update.

FIG. 15A illustrates an example of the data structure of the priority information table 1300 before update. FIG. 15B illustrates an example of the data structure of the priority information table 1300a after update.

DESCRIPTION OF EMBODIMENTS

1. First Embodiment

Embodiments of the present invention are described below with reference to the drawings.

1.1 Structure

Figure 1:
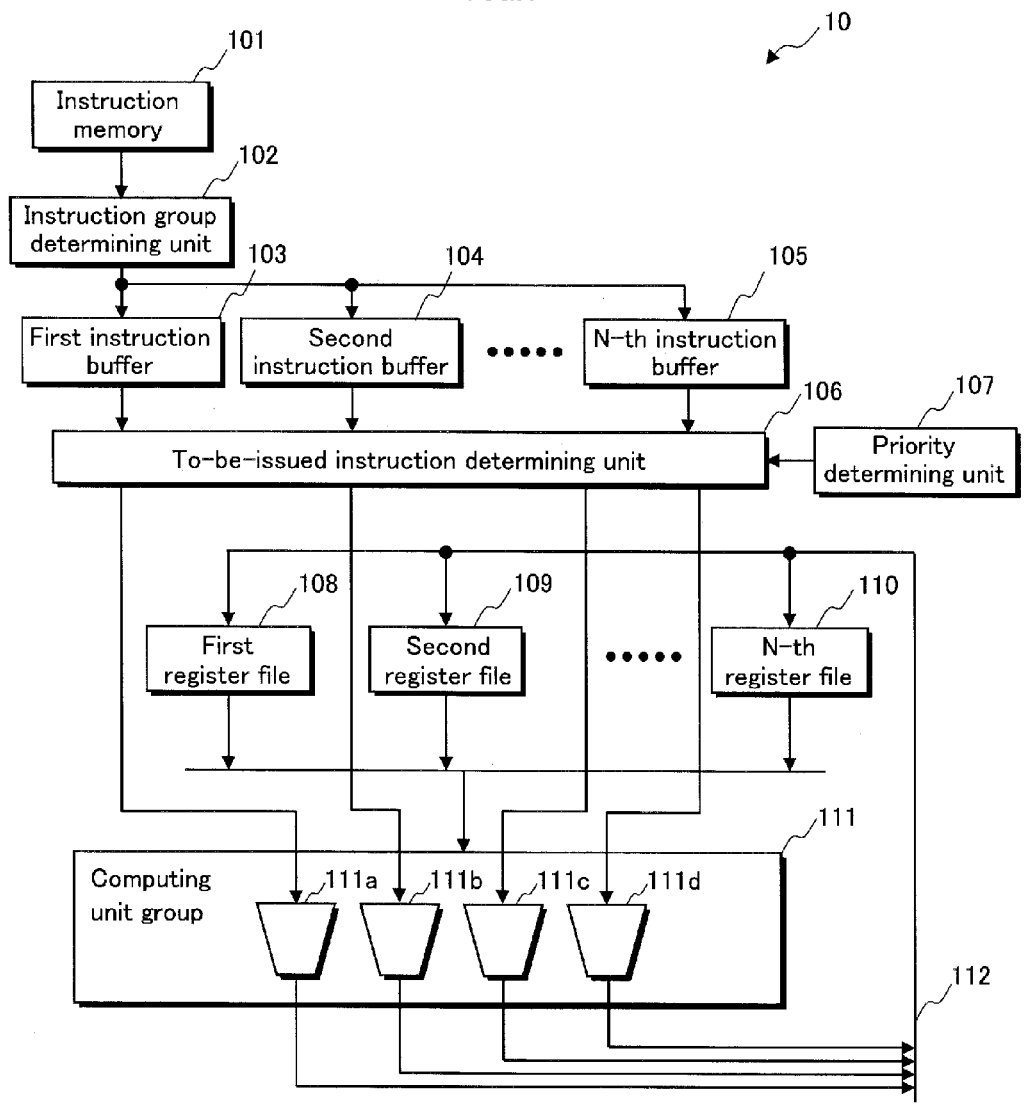
FIG. 1 illustrates the structure of the processor 10.

FIG. 1 is a block diagram showing the structure of a processor 10 in the first embodiment of the present invention.

The processor 10 is a processor that independently executes N instruction streams (N threads) simultaneously, where N is an integer equal to or greater than 2. The processor 10 includes an instruction memory 101, an instruction group determining unit 102, N instruction buffers (a first instruction buffer 103, a second instruction buffer 104, . . . , an N-th instruction buffer 105), a to-be-issued instruction determining unit 106, a priority determining unit 107, N register files (a first register file 108, a second register file 109, . . . , an N-th register file 110), a computing unit group 111, and a write-back bus 112.

The instruction buffers and the register files correspond to each other on a one-to-one basis, and constitute N logical processors.

In the present embodiment, the processor 10 can execute four instructions simultaneously.

(1) Instruction Memory 101

The instruction memory 101 is a memory that holds instructions executed by the processor 10, and holds N instruction streams (threads) that are executed independently.

(2) Instruction Group Determining Unit 102

The instruction group determining unit 102 reads, from the instruction memory 101, an instruction belonging to an instruction stream, decodes the instruction, and writes the instruction into an instruction buffer to which the instruction is allocated.

(3) First Instruction Buffer 103 to N-th Instruction Buffer 105

The i-th instruction buffer ("i" is an integer in a range from "1" to "N") receives instructions belonging to the i-th instruction stream and holds the instructions.

Figure 2:
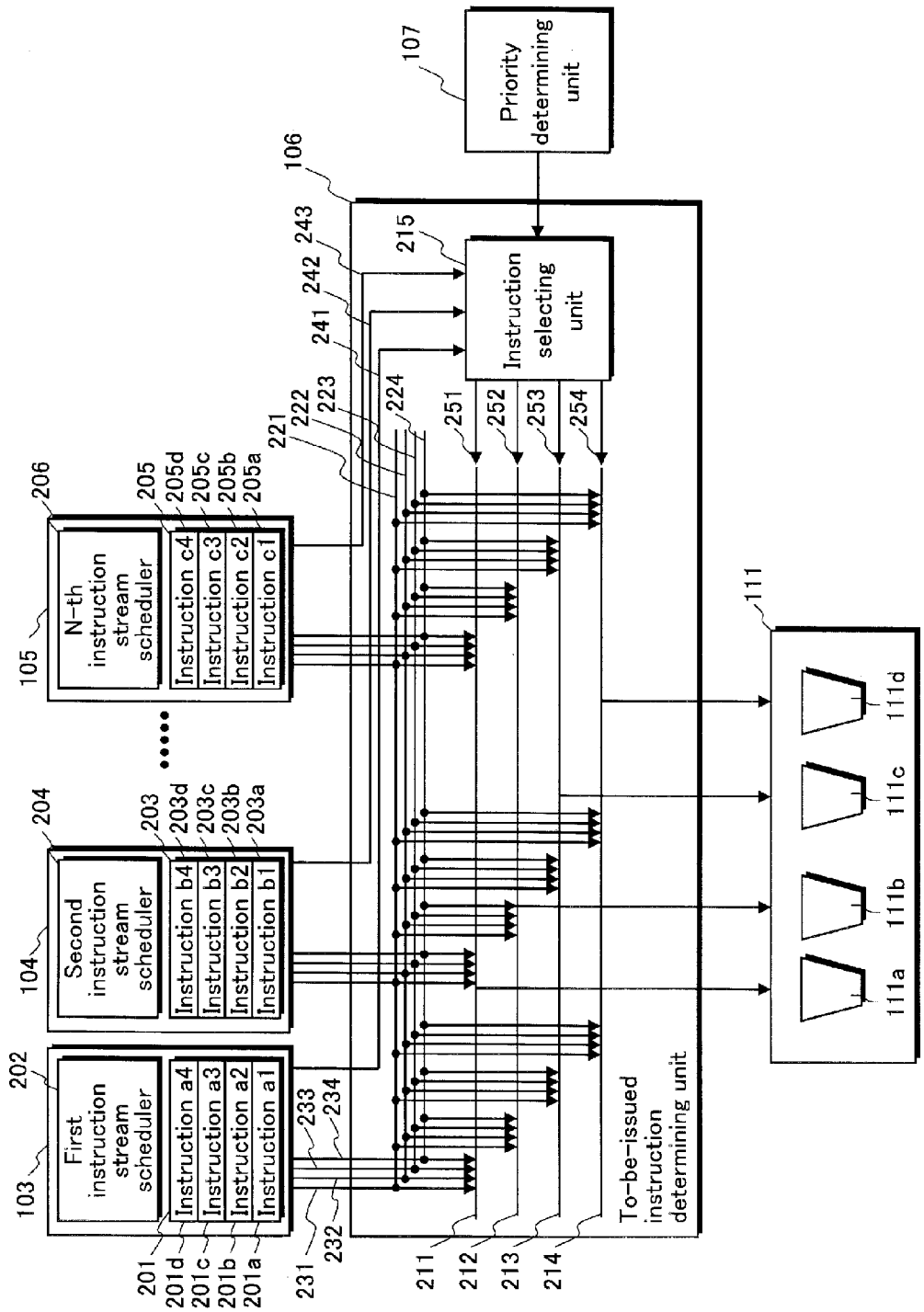
FIG. 2 illustrates the structure of the instruction buffers 103 to 105 and the to-be-issued instruction determining unit 106.

More specifically, as shown in FIG. 2, the first instruction buffer 103 includes a first instruction holding unit 201 and a first instruction stream scheduler 202.

Figure 3:
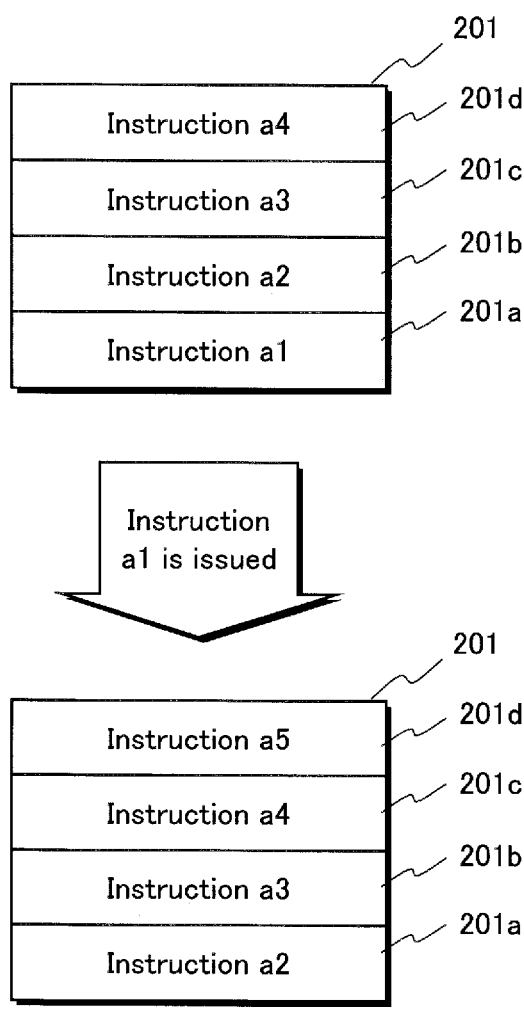
FIG. 3 illustrates the change of instructions held by the instruction buffer before and after an issuance of an instruction.

The first instruction holding unit 201 includes a first storage area 201a to a fourth storage area 201d to hold four instructions. The four instructions are stored into the first storage area 201a, second storage area 201b, third storage area 201c, and fourth storage area 201d in sequence based on the execution order. For example, as shown in FIG. 3, after an instruction a1 held by the first storage area 201a is executed (issued), the instructions a2, a3, and a4 are shifted by one from the second storage area 201b, the third storage area 201c, and the fourth storage area 201d to the first storage area 201a, the second storage area 201b, and the third storage area 201c, respectively, and a new instruction a5 is stored into the fourth storage area 201d.

The first instruction stream scheduler 202 includes flags that are associated one-to-one with the first storage area 201a to the fourth storage area 201d included in the first instruction holding unit 201. Each of the flags indicates whether or not an instruction stored in an associated storage area is in an issuable (executable) state. For example, an external unit (for example, the instruction group determining unit 102) detects an instruction that can be issued in a machine cycle, based on flow dependencies present between the instructions, and sets an associated flag to a value indicating that the instruction is in the issuable state.

The second instruction buffer 104 includes a second instruction holding unit 203 and a second instruction stream scheduler 204. The N-th instruction buffer 105 includes an N-th instruction holding unit 205 and an N-th instruction stream scheduler 206. These structural elements are similar to those of the first instruction buffer 103, and description thereof is omitted here.

(4) Priority Determining Unit 107

The priority determining unit 107 holds a priority information table 300 which is used by the to-be-issued instruction determining unit 106 when it determines instructions to be issued.

The priority information table 300, for example as shown in FIG. 4, includes priority information 301, instruction stream information 302, and instruction number information 303, and includes 4×N table elements associated one-to-one with a total of 4×N storage areas provided in the N instruction buffers, each table element including respective pieces of priority information 301, instruction stream information 302, and instruction number information 303.

The priority information 301 includes values which indicate an order in which the instructions stored in the 4×N storage areas of the N instruction buffers are read.

The instruction stream information 302 includes values identifying the instruction streams. In this example, a value "i" ("i" is an integer in a range from "1" to "N") indicates the i-th instruction stream.

The instruction number information 303 includes values identifying the storage areas of the i-th instruction holding unit that holds the i-th instruction stream indicated by the instruction stream information 302. In this example, a value "n" ("n" is an integer in a range from "1" to "4") indicates the n-th storage area.

For example, a table element 304 specifies an instruction having priority "1" which is an instruction stored in the first storage area 201a of the first instruction stream.

Also, a table element 305 specifies an instruction having priority "2" which is an instruction stored in the first storage area 203a of the second instruction stream.

A table element 306 specifies an instruction having priority "3" which is an instruction stored in the second storage area 201b of the second instruction stream.

A table element 307 specifies an instruction having priority "4" which is an instruction stored in the third storage area 201c of the second instruction stream.

A table element 308 specifies an instruction having priority "5" which is an instruction stored in the second storage area 201b of the first instruction stream.

It is presumed here that the priorities of the instructions shown in the priority information table 300 have been set preliminarily. The priorities are set as follows, for example. If the first instruction stream is an instruction stream whose performance needs to be guaranteed to a certain extent and needs to complete a process within a predetermined time period (for example, within a time period "t"), one or more priorities are assigned to instructions of the instruction stream at each instruction issuing timing (in each machine cycle) so that the minimum number of instructions for enabling the first instruction stream to complete the process within the time period "t" can be issued. Here, it is presumed, for example, that the first instruction stream can complete the process within the predetermined time period if one instruction is issued in each machine cycle. In this case, since four instructions are executed simultaneously in the present embodiment, by assigning the highest priority among the four highest priorities to an instruction of the first instruction stream, one instruction of the first instruction stream can always be issued in each machine cycle.

(5) To-Be-Issued Instruction Determining Unit 106

The to-be-issued instruction determining unit 106 determines instructions to be issued in each machine cycle from among the instructions stored in the first instruction buffer 103 to the N-th instruction buffer 105.

The to-be-issued instruction determining unit 106 selects four instructions from among the instructions that are in the executable state and stored in the storage areas in accordance with the order indicated by the priority information table 300, based on the first instruction stream scheduler 202 to the N-th instruction stream scheduler 206 and the priority information table 300, and outputs the selected instructions to the respective computing units.

The following explains the hardware structure of the to-be-issued instruction determining unit 106 with reference to FIG. 2.

The to-be-issued instruction determining unit 106 includes a first instruction determining unit 211 to a fourth instruction determining unit 214, an instruction selecting unit 215, and a first instruction extracting unit 221 to a fourth instruction extracting unit 224.

(5-1) Instruction Selecting Unit 215

The instruction selecting unit 215 selects four instructions from among the instructions that are in the executable state and stored in the storage areas, in accordance with the order indicated by the priority information table 300, based on the first instruction stream scheduler 202 to the N-th instruction stream scheduler 206 and the priority information table 300, and outputs the selected instructions to the respective computing units. More specifically, the instruction selecting unit 215 receives, from the first instruction buffer 103 to the N-th instruction buffer 105, signals indicating the number of issuable instructions in each of the instruction buffers. That is to say, the instruction selecting unit 215 receives signals 241 to 243 each indicating the number of instructions that are in the executable state, and identifies the four instructions to be selected, in accordance with the order indicated by the priority information table 300.

The instruction selecting unit 215 outputs, to the first instruction determining unit 211 to the fourth instruction determining unit 214, to-be-issued instruction select signals 251 to 254 that indicate instructions to be obtained by the respective instruction determining units. Each of the to-be-issued instruction select signals includes information indicating an instruction to be extracted. For example, the information indicates an instruction buffer and a storage area in which the instruction to be extracted is stored.

(5-2) First Instruction Extracting Unit 221 to Fourth Instruction Extracting Unit 224

The n-th instruction extracting unit ("n" is an integer in a range from "1" to "4") extracts instructions from the n-th storage areas of the first instruction buffer 103 to the N-th instruction buffer 105.

As a specific example, the following explains the extraction of instructions from the first instruction buffers 103.

The first instruction extracting unit 221 is connected with a connection line 231, the second instruction extracting unit 222 with a connection line 232, the third instruction extracting unit 223 with a connection line 233, and the fourth instruction extracting unit 224 with a connection line 234. The connection line 231 is connected with the first storage area 201a, the connection line 232 with the second storage area 201b, the connection line 233 with the third storage area 201c, and the connection line 234 with the fourth storage area 201d.

The first instruction extracting unit 221 reads (extracts) an instruction from the first storage area via the connection line 231, and outputs the instruction to the instruction determining unit that has instructed to extract the instruction.

Similarly, the second instruction extracting unit 222 to the fourth instruction extracting unit 224 read (extract) instructions from the corresponding storage areas via the connection lines connected with the storage areas, and output the instructions to the instruction determining units that have instructed the extraction of the instructions.

(5-3) First Instruction Determining Unit 211 to Fourth Instruction Determining Unit 214

The first instruction determining unit 211 to the fourth instruction determining unit 214 are associated one-to-one with computing units included in the computing unit group 111.

The following describes the functions of the first instruction determining unit 211 to the fourth instruction determining unit 214.

The n-th instruction determining unit ("n" is an integer in a range from "1" to "4") identifies an instruction buffer and a storage area of the instruction buffer from which an instruction is to be obtained, based on an instruction selection signal received from the instruction selecting unit 215. The n-th instruction determining unit then controls a corresponding m-th instruction extracting unit ("m" is an integer in a range from "1" to "4") to extract the instruction to be extracted.

The n-th instruction determining unit obtains the instruction extracted by the m-th instruction extracting unit, and outputs the obtained instruction to a corresponding computing unit.

(6) First Register File 108 to N-th Register File 110

The i-th register file ("i" is an integer in a range from "1" to "N") is a register group that holds data to be read and written when an instruction stream stored in the i-th instruction buffer is executed.

(7) Computing Unit Group 111

The computing unit group 111 includes a plurality of computing units each of which is an adder, multiplier or the like. In this example, the computing unit group 111 includes four computing units (a computing unit 111a to a computing unit 111d). Also, the computing unit 111a is associated with the first instruction determining unit 211, the computing unit 111b with the second instruction determining unit 212, the computing unit 111c with the third instruction determining unit 213, and the computing unit 111d with the fourth instruction determining unit 214.

Each instruction processed by the computing units includes information identifying an instruction stream to which the instruction belongs. The computing units output computation results to corresponding register files, based on the information included in each instruction.

(8) Write-Back Bus 112

The write-back bus 112 is a bus for writing output data from the computing unit group 111 back to the first register file 108 to the N-th register file 110.

1.2 Operation

Figure 5:
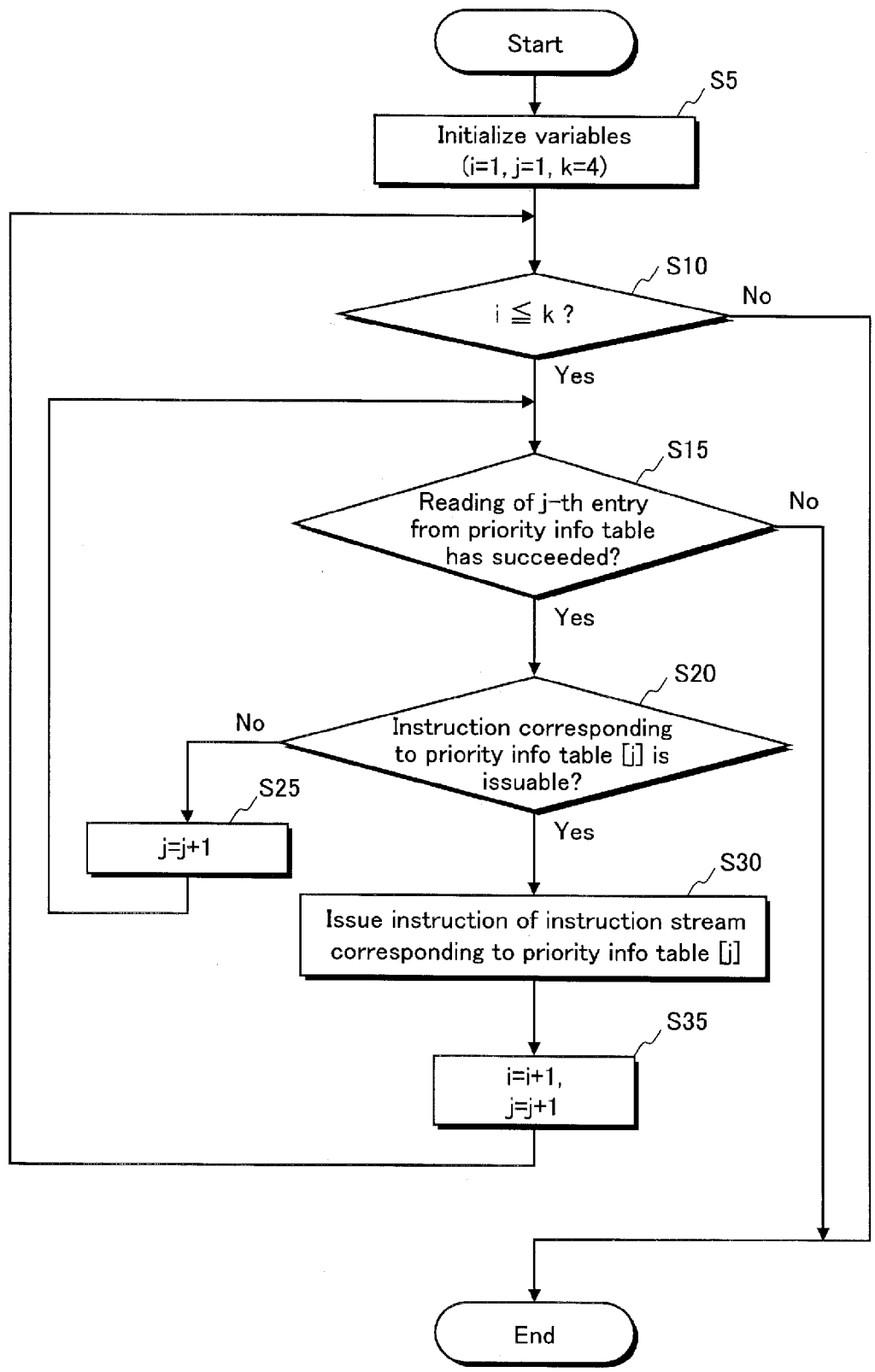
FIG. 5 is a flowchart illustrating the operation for determining instructions to be issued in the first embodiment.

The following explains the operation for determining instructions to be issued, with reference to a flowchart shown in FIG. 5.

The instruction selecting unit 215 initializes variables (i=1; j=1; k=4) when determining instructions to be issued in a machine cycle (step S5). Note that a variable "i" is a counter that counts the instructions issued in each machine cycle; a variable "j" is a pointer that points to information to be read from the priority information table 300 as shown in FIG. 4; and a variable "k" indicates the maximum number of instructions that can be issued in a machine cycle, which is "4" in the present embodiment.

The instruction selecting unit 215 judges whether or not the variable "i" is equal to or smaller than the variable "k", namely whether or not the number of instructions to be issued is equal to or smaller than the maximum number (step S10).

If the instruction selecting unit 215 judges that the variable "i" is equal to or smaller than the variable "k" ("Yes" in step S10), the instruction selecting unit 215 attempts to read the j-th entry from the priority information table 300, and judges whether or not the reading has succeeded (step S15).

If the instruction selecting unit 215 judges that reading the j-th entry has succeeded ("Yes" in step S15), the instruction selecting unit 215 judges whether or not an instruction of an instruction stream indicated by the obtained j-th entry is issuable (step S20).

If the instruction selecting unit 215 judges that the instruction is not issuable ("No" in step S20), a value "1" is added to the variable "j" (step S25), and the control returns to step S15.

If the instruction selecting unit 215 judges that the instruction is issuable ("Yes" in step S20), the instruction selecting unit 215 outputs a to-be-issued instruction select signal to the i-th instruction determining unit. Upon receiving the to-be-issued instruction select signal, the i-th instruction determining unit causes an instruction extracting unit, which corresponds to the storage area in which the instruction to be issued is stored, to extract the instruction, and outputs the instruction extracted by the instruction extracting unit to a corresponding computing unit (step S30).

Subsequently, a value "1" is added to each of the variable "i" and variable "j" (step S35), and the control returns to step S10.

If the instruction selecting unit 215 judges that the variable "i" is greater than the variable "k" ("No" in step S10), or if it judges that reading the j-th entry has failed, namely, if there is no entry at a position pointed to by the pointer ("No" in step S15), the processing ends.

1.3 Operation Image

Figure 6:
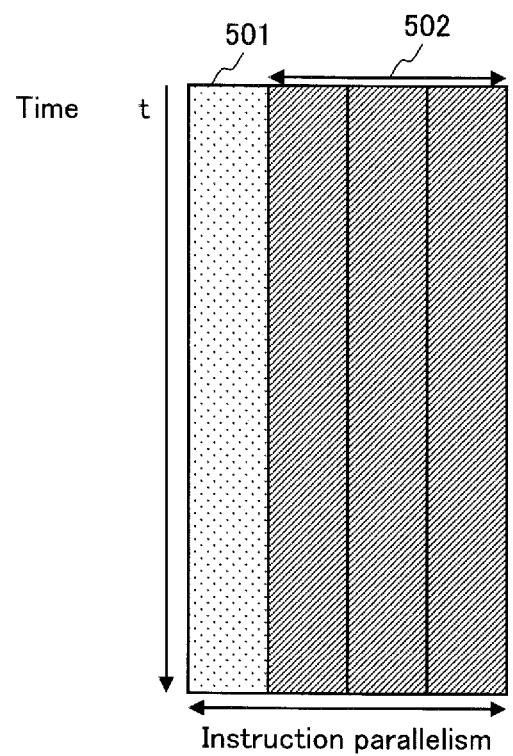
FIG. 6 illustrates an operation image indicating how instructions are assigned (issued) during the parallel processing using the first and second instruction streams in the first embodiment.

FIG. 6 illustrates an operation image indicating how instructions are assigned (issued) during the parallel processing using the first and second instruction streams in the first embodiment.

Note that in the operation image illustrated in FIG. 6, the vertical axis represents time, and the horizontal axis represents the instruction parallelism (how computing units are used).

A block 501 indicates how an instruction of the first instruction stream is executed, and in this example indicates that always an instruction is issued with priority.

A block 502 indicates how instructions of the second instruction stream are executed, and in this example indicates that the three instructions are executed in parallel by using computing units that are not used by the first instruction stream.

With this structure, for example, if the first instruction stream is an instruction stream that is required to guarantee a predetermined level of performance and the performance is satisfied when an instruction is always issued within the predetermined time period (for example, within the time period "t"), the present embodiment satisfies the requirement to guarantee the predetermined level of performance, while maintaining the high responsiveness of the other instructions.

2. Second Embodiment

The following explains a processor 10a in the second embodiment, centering on the differences from the processor 10 in the first embodiment.

Figure 7:
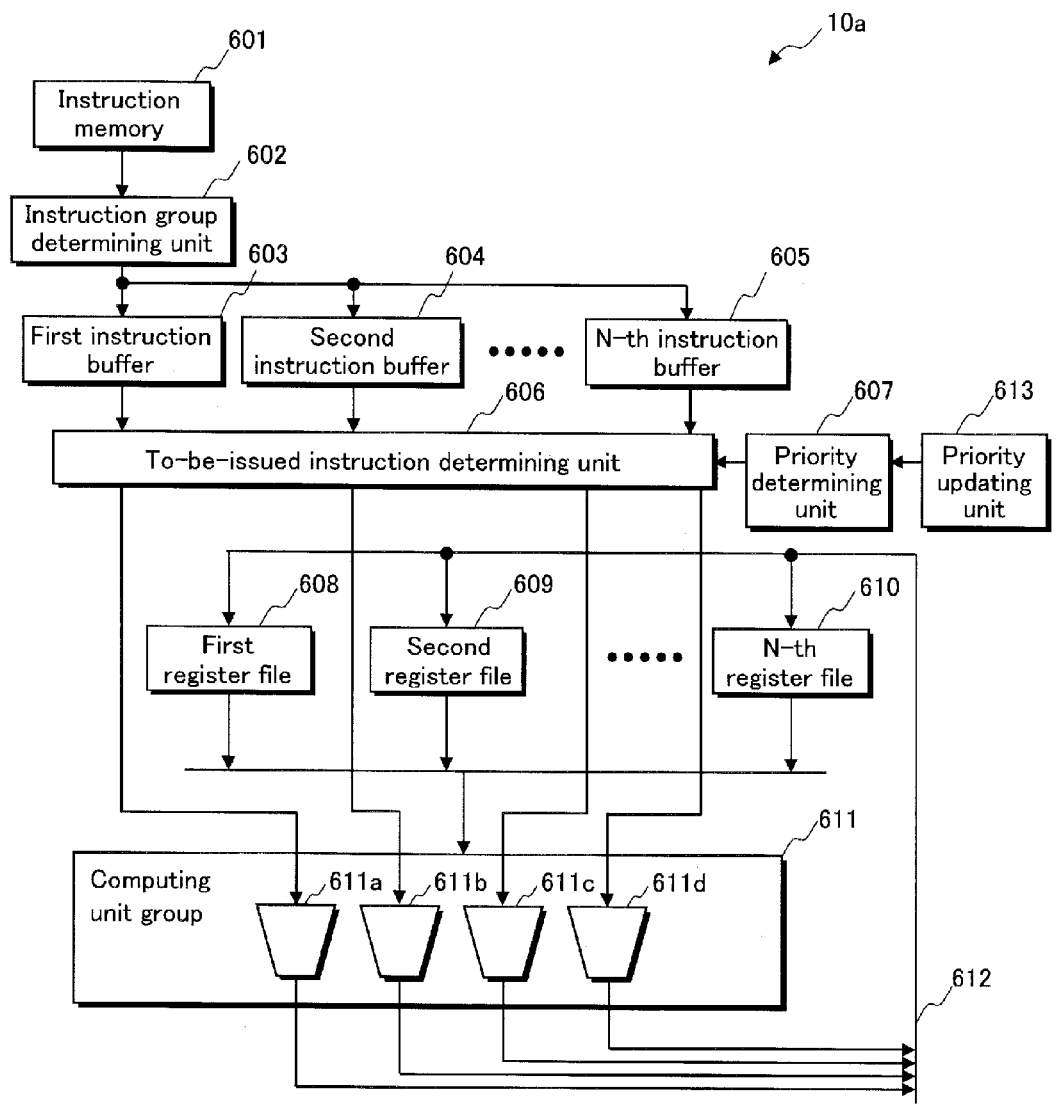

FIG. 7 is a block diagram showing the structure of the processor 10a in the second embodiment.

The processor 10a is a processor that independently executes N instruction streams (N threads) simultaneously, where N is an integer equal to or greater than 2. The processor 10a includes an instruction memory 601, an instruction group determining unit 602, N instruction buffers (a first instruction buffer 603, a second instruction buffer 604, . . . , an N-th instruction buffer 605), a to-be-issued instruction determining unit 606, a priority determining unit 607, N register files (a first register file 608, a second register file 609, . . . , an N-th register file 610), a computing unit group 611, a write-back bus 612, and a priority updating unit 613.

The instruction buffers and the register files correspond to each other on a one-to-one basis, and constitute N logical processors.

In the present embodiment, the processor 10a can execute four instructions simultaneously, as is the case with the processor 10 in the first embodiment.

(1) Instruction Memory 601

The instruction memory 601, as is the case with the instruction memory 101 in the first embodiment, is a memory that holds instructions executed by the processor 10a, and holds N instruction streams (threads) that are executed independently.

(2) Instruction Group Determining Unit 602

The instruction group determining unit 602 is similar to the instruction group determining unit 102 in the first embodiment, and description thereof is omitted here.

(3) First Instruction Buffer 603 to N-th Instruction Buffer 605

The i-th instruction buffer ("i" is an integer in a range from "1" to "N") receives an instruction belonging to the i-th instruction stream and holds the instruction.

Figure 8:
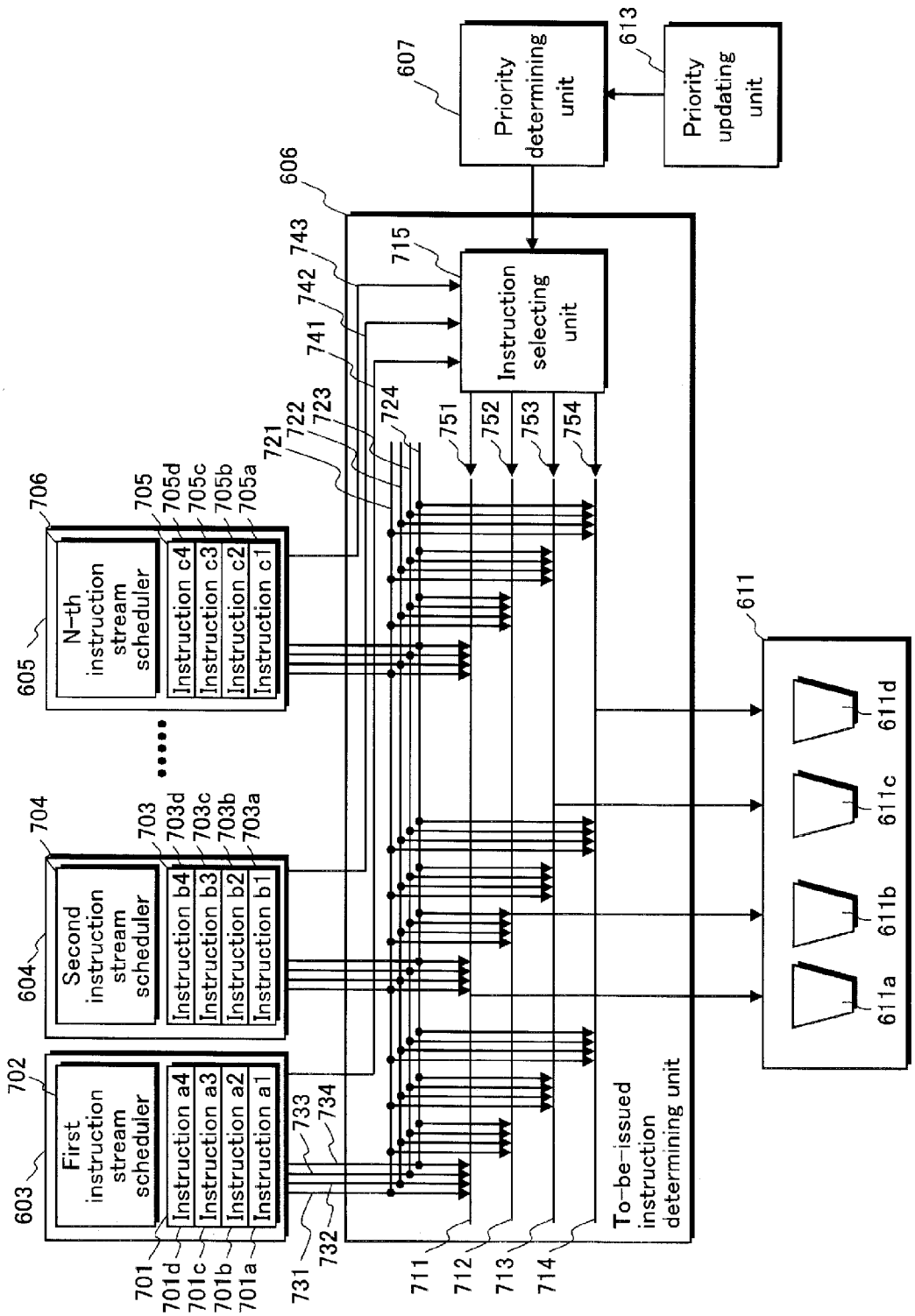
FIG. 8 illustrates the structure of the instruction buffers 603 to 605 and the to-be-issued instruction determining unit 606.

More specifically, as shown in FIG. 8, the first instruction buffer 603 includes a first instruction holding unit 701 and a first instruction stream scheduler 702. The first instruction holding unit 701 and the first instruction stream scheduler 702 are similar to the first instruction holding unit 201 and the first instruction stream scheduler 202 in the first embodiment, and description thereof is omitted here.

The second instruction buffer 604 includes a second instruction holding unit 703 and a second instruction stream scheduler 704. The N-th instruction buffer 605 includes an N-th instruction holding unit 705 and an N-th instruction stream scheduler 706. These structural elements are similar to those of the first embodiment, and description thereof is omitted here.

(4) Priority Determining Unit 607

The priority determining unit 607 holds a priority information table 800 which is used by the to-be-issued instruction determining unit 606 when it determines instructions to be issued.

The priority information table 800, for example as shown in FIG. 9, includes priority information 801, instruction stream information 802, and instruction number information 803. The priority information table 800 includes 4×N table elements associated one-to-one with a total of 4×N storage areas provided in the N instruction buffers. The priority information 801, instruction stream information 802, and instruction number information 803 are similar to the priority information 301, instruction stream information 302, and instruction number information 303, and description thereof is omitted here.

It is presumed here that the priority information table 800 in the initialized state indicates the priorities of the instructions (priorities in issuance of the instructions) that are set by the method explained in the first embodiment.

(5) Priority Updating Unit 613

The priority updating unit 613 updates the priority information table 800 held by the priority determining unit 607, under a predetermined condition.

More specifically, the priority updating unit 613 updates the priority information table 800, which stores the priority information and is held by the priority determining unit 607, in accordance with an instruction from the software.

Normally, entries (priority information) of the priority information table 800 held by the priority determining unit 607 are mapped in the memory address or control register. Thus upon receiving, as an instruction from the software, a memory access instruction or a control register access instruction from the multithreaded processor, the priority updating unit 613 updates the priority information table 800 based on the received instruction. For example, the priority updating unit 613 receives a writing address and writing data with a memory access instruction or a control register access instruction from the multithreaded processor, and if the writing address indicates any of the entries of the priority information table 800, the priority updating unit 613 writes the writing data into the entry indicated by the writing address. In this example, the writing data is an updated piece of priority information that is to be written into the entry. Also, the instruction from the software is executed by a program that has been preliminarily written to be executed after a predetermined instruction is issued (namely, executed on the program).

Note that a plurality of entries may be updated all at once when an instruction is received from the software.

FIG. 9B illustrates a priority information table 800a as an example of a result of updating the priority information table 800. In this example, the priority updating unit 613 has updated priority "5" in the priority information of entry 808 in the priority information table 800 to "2", in accordance with an instruction from the software. As a result, the priority information of entry 808 before update has been updated to the priority information of entry 810, namely, "2", and the priorities of priority information of entries 805 to 807 have been shifted down by one, to the values shown by priority information of entries 811 to 813 after the update, respectively.

The following explains the structural elements with reference to the priority information table 800.

(6) To-Be-Issued Instruction Determining Unit 606

The to-be-issued instruction determining unit 606 determines instructions to be issued in each machine cycle from among the instructions stored in the first instruction buffer 603 to the N-th instruction buffer 605.

The to-be-issued instruction determining unit 606 selects four instructions from among the instructions that are in the executable state and stored in the storage areas, in accordance with the order indicated by the priority information table 800, based on the first instruction stream scheduler 702 to the N-th instruction stream scheduler 706 and the priority information table 800, and outputs the selected instructions to the respective computing units.

The following explains the hardware structure of the to-be-issued instruction determining unit 606 with reference to FIG. 8.

The to-be-issued instruction determining unit 606 includes a first instruction determining unit 711 to a fourth instruction determining unit 714, an instruction selecting unit 715, and a first instruction extracting unit 721 to a fourth instruction extracting unit 724.

(6-1) Instruction Selecting Unit 715

The instruction selecting unit 715 is similar to the instruction selecting unit 215 described in the first embodiment. More specifically, the instruction selecting unit 715 receives, from the first instruction buffer 603 to the N-th instruction buffer 605, signals indicating the number of issuable instructions in each of the instruction buffer. That is to say, the instruction selecting unit 715 receives signals 741 to 743 each indicating the number of instructions that are in the executable state, and identifies the four instructions to be selected, in accordance with the order indicated by the priority information table 800.

The instruction selecting unit 715 outputs, to the first instruction determining unit 711 through the fourth instruction determining unit 714, to-be-issued instruction select signals 751 through 754 that indicate instructions to be obtained by the respective instruction determining units. Each of the to-be-issued instruction select signals includes information indicating an instruction to be extracted. For example, the information indicates an instruction buffer and a storage area in which the instruction to be extracted is stored.

(6-2) First Instruction Extracting Unit 721 to Fourth Instruction Extracting Unit 724

The first instruction extracting unit 721 to fourth instruction extracting unit 724 are similar to the first instruction extracting unit 221 to fourth instruction extracting unit 224 described in the first embodiment, and description thereof is omitted here.

(6-3) First Instruction Determining Unit 711 to Fourth Instruction Determining Unit 714

The first instruction determining unit 711 to the fourth instruction determining unit 714 are associated one-to-one with computing units included in the computing unit group 611 and their functions are similar to those of the first instruction determining unit 211 to the fourth instruction determining unit 214 described in the first embodiment, and description thereof is omitted here.

(7) First Register File 608 to N-th Register File 610

The first register file 608 to N-th register file 610 are similar to the first register file 108 to N-th register file 110 described in the first embodiment, and description thereof is omitted here.

(8) Computing Unit Group 611

The computing unit group 611 includes a plurality of computing units each of which is an adder, multiplier or the like. In this example, the computing unit group 611 includes four computing units (a computing unit 611$a$ to a computing unit 611$d$). Also, the computing unit 611$a$ is associated with the first instruction determining unit 711, the computing unit 611$b$ with the second instruction determining unit 712, the computing unit 611$c$ with the third instruction determining unit 713, and the computing unit 611$d$ with the fourth instruction determining unit 714.

Each instruction processed by the computing units includes information identifying an instruction stream to which the instruction belongs. The computing units output computation results to corresponding register files, based on the information included in each instruction.

(9) Write-Back Bus 612

The write-back bus 612 is a bus for writing output data from the computing unit group 611 back to the first register file 608 to the N-th register file 610.

2.2 Operation (1) Operation for Determining Instruction to be Issued

Figure 10:
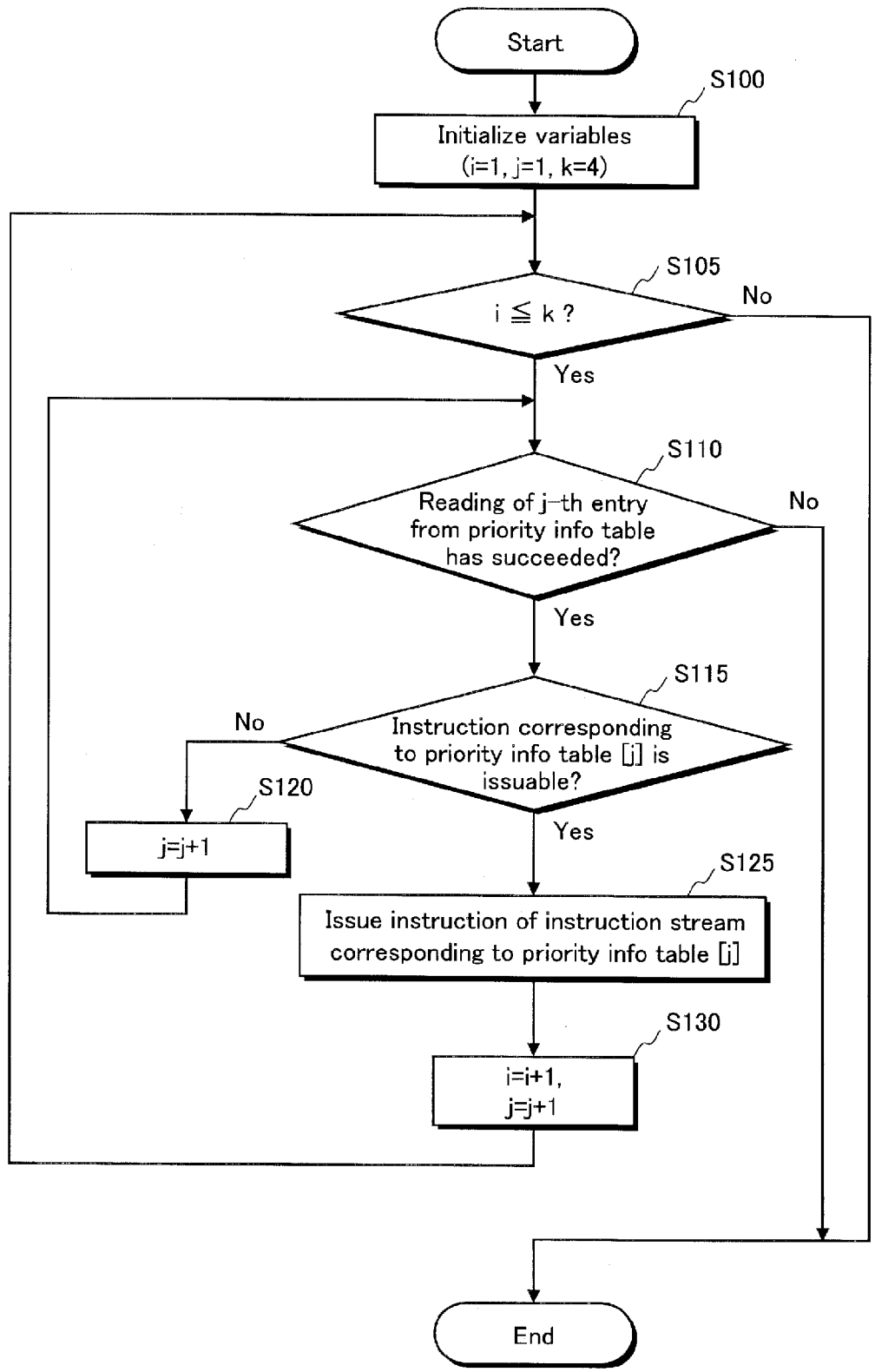
FIG. 10 is a flowchart illustrating the operation for determining instructions to be issued in the second embodiment.

The following explains the operation for determining instructions to be issued, with reference to a flowchart shown in FIG. 10. In the following explanation, it is presumed for convenience's sake that the priority information table used in the operation is the priority information table 800. Note that the processing operation is the same if the updated priority information table 800$a$ is used.

The instruction selecting unit 715 initializes variables ($i=1$; $j=1$; $k=4$) when determining instructions to be issued in a machine cycle (step S100). Note that a variable "i" is a counter that counts the instructions issued in each machine cycle; a variable "j" is a pointer that points to information to be read from the priority information table 800; and a variable "k" indicates the maximum number of instructions that can be issued in a machine cycle, which is "4" in the present embodiment.

The instruction selecting unit 715 judges whether or not the variable "i" is equal to or smaller than the variable "k", namely whether or not the number of instructions to be issued is equal to or smaller than the maximum number (step S105).

If the instruction selecting unit 715 judges that the variable "i" is equal to or smaller than the variable "k" ("Yes" in step S105), the instruction selecting unit 715 attempts to read the j-th entry from the priority information table 800, and judges whether or not the reading has succeeded (step S110).

If the instruction selecting unit 715 judges that reading the j-th entry has succeeded ("Yes" in step S110), the instruction selecting unit 715 judges whether or not an instruction of an instruction stream indicated by the obtained j-th entry is issuable (step S115).

If the instruction selecting unit 715 judges that the instruction is not issuable ("No" in step S115), a value "1" is added to the variable "j" (step S120), and the control returns to step S110.

If the instruction selecting unit 715 judges that the instruction is issuable ("Yes" in step S115), the instruction selecting unit 715 outputs a to-be-issued instruction select signal to the i-th instruction determining unit. Upon receiving the to-be-issued instruction select signal, the i-th instruction determining unit causes an instruction extracting unit, which corresponds to the storage area in which the instruction to be issued is stored, to extract the instruction, and outputs the instruction extracted by the instruction extracting unit to a corresponding computing unit (step S125).

Subsequently, a value "1" is added to each of the variable "i" and variable "j" (step S130), and the control returns to step S105.

If the instruction selecting unit 715 judges that the variable "i" is greater than the variable "k" ("No" in step S105), or if it judges that reading the j-th entry has failed, namely, if there is no entry at a position pointed to by the pointer ("No" in step S110), the processing ends.

(2) Operation for Updating Priority Information Table

Figure 11:
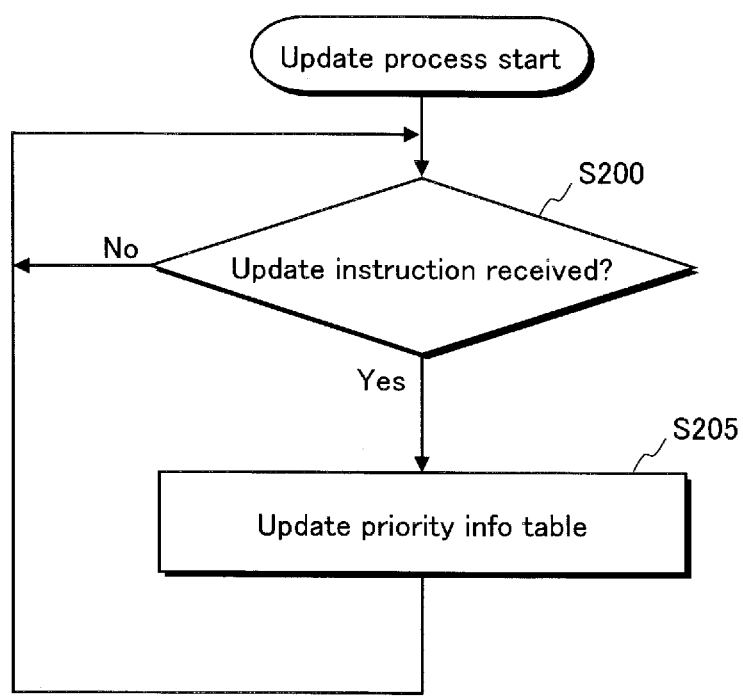
FIG. 11 is a flowchart illustrating the operation for updating the priority information table 800 in the second embodiment.

The following explains the operation for updating the priority information table, with reference to a flowchart shown in FIG. 11.

The priority updating unit 613 judges whether or not an update instruction (a control register access instruction or a memory access instruction specifying an entry of the priority information table 800) has been received from the software (step S200).

If it judges that an update instruction has been received ("Yes" in step S200), the priority updating unit 613 updates the priority information table 800 based on the received instruction (step S205).

After the priority updating unit 613 updates the priority information table 800, or if it judges that an update instruction has not been received ("No" in step S200), the control returns to step S200 in which an update instruction is awaited, Note that, as described above, the update instruction is issued after a predetermined instruction is issued (namely, executed on the program).

2.3 Operation Image

Figure 12:
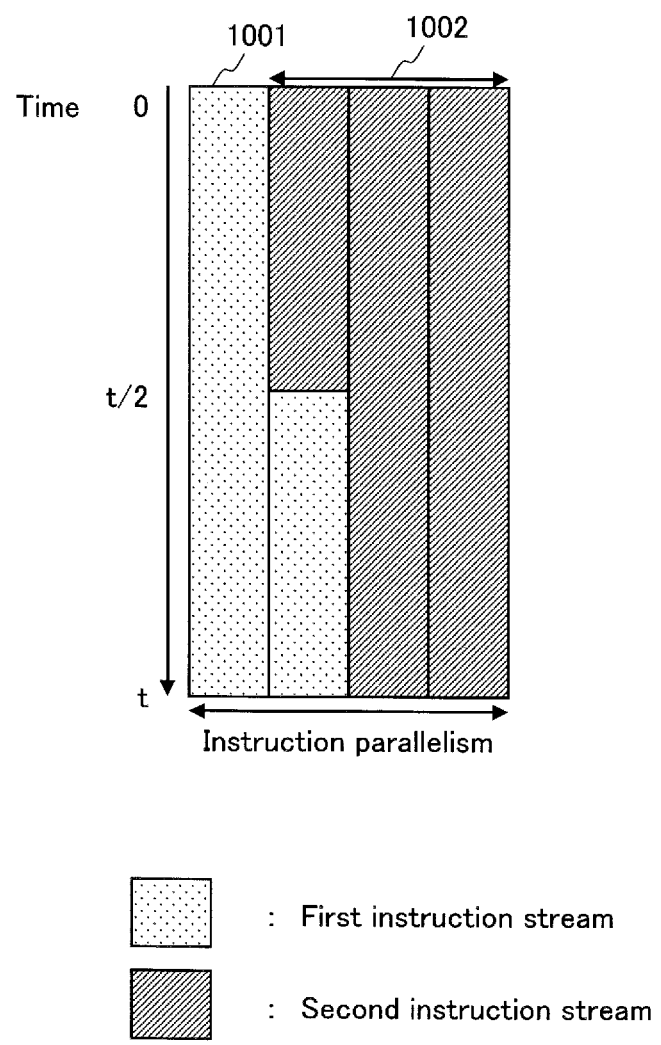
FIG. 12 illustrates an operation image indicating how instructions are assigned (issued) during the parallel processing using the first and second instruction streams in the second embodiment.

FIG. 12 illustrates an operation image indicating how instructions are assigned (issued) during the parallel processing using the first and second instruction streams in the second embodiment.

Note that in the operation image illustrated in FIG. 12, the vertical axis represents time, and the horizontal axis represents the instruction parallelism.

A block 1001 indicates how an instruction of the first instruction stream is executed, and indicates that, up to time "t/2", always an instruction is issued with priority in accordance with the priority order indicated by the priority information table 800 shown in FIG. 9A.

A block 1002 indicates how instructions of the second instruction stream are executed, and in this example indicates that, up to time "t/2", the instructions are executed in parallel by using computing units that are not used by the first instruction stream.

At time "t/2", by an instruction from the software, the priority information table 800 shown in FIG. 9A is updated to the priority information table 800a shown in FIG. 9B. After this, always two instructions of the first instruction stream are issued with priority in accordance with the priority order indicated by the priority information table 800a shown in FIG. 9B, and two instructions of the second instruction stream are issued.

With this structure, for example, if the first instruction stream is an instruction stream that is required to guarantee a predetermined level of performance and the performance is satisfied when one computing unit is allocated to one instruction, the present embodiment satisfies the requirement to guarantee the predetermined level of performance, while maintaining the high responsiveness of the other instructions.

3. Third Embodiment

The following explains a processor 10b in the third embodiment, centering on the differences from the processors 10 and 10a in the first and second embodiments.

Figure 13:
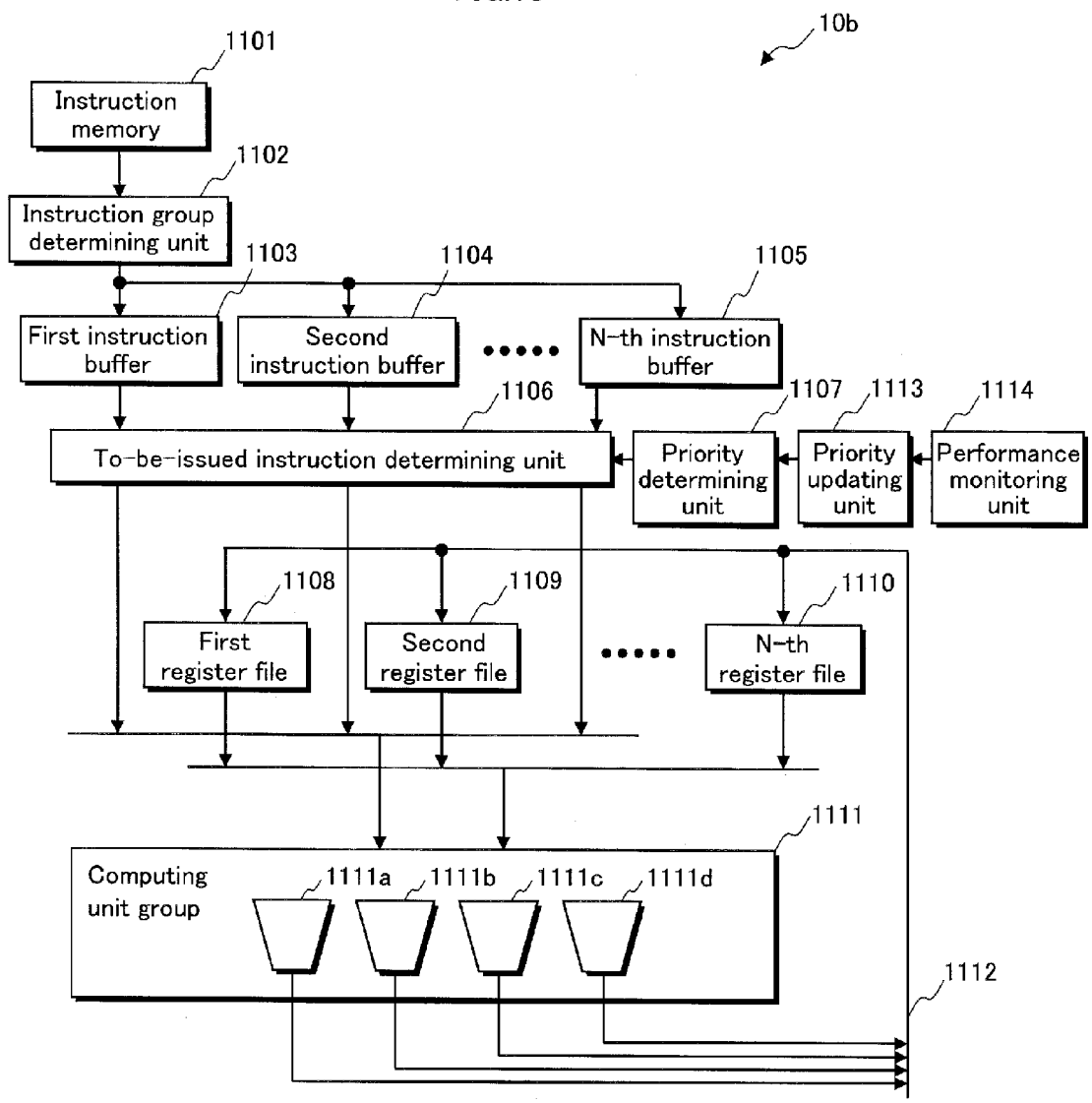
FIG. 13 illustrates the structure of the processor 10b.

FIG. 13 is a block diagram showing the structure of the processor 10b in the third embodiment.

The processor 10b is a processor that independently executes N instruction streams (N threads) simultaneously, where N is an integer equal to or greater than 2. The processor 10b includes an instruction memory 1101, an instruction group determining unit 1102, N instruction buffers (a first instruction buffer 1103, a second instruction buffer 1104, . . . , an N-th instruction buffer 1105), a to-be-issued instruction determining unit 1106, a priority determining unit 1107, N register files (a first register file 1108, a second register file 1109, . . . , an N-th register file 1110), a computing unit group 1111, a write-back bus 1112, a priority updating unit 1113, and a performance monitoring unit 1114.

The instruction buffers and the register files correspond to each other on a one-to-one basis, and constitute N logical processors.

In the present embodiment, the processor 10b can execute four instructions simultaneously, as is the case with the processors 10 and 10a in the first and second embodiments.

(1) Instruction Memory 1101

The instruction memory 1101, as is the case with the instruction memory 101 in the first embodiment, is a memory that holds instructions executed by the processor 10b, and holds N instruction streams (threads) that are executed independently.

(2) Instruction Group Determining Unit 1102

The instruction group determining unit 1102 is similar to the instruction group determining unit 102 in the first embodiment, and description thereof is omitted here.

(3) First Instruction Buffer 1103 to N-th Instruction Buffer 1105

The i-th instruction buffer ("i" is an integer in a range from "1" to "N") receives an instruction belonging to the i-th instruction stream and holds the instruction.

Figure 14:
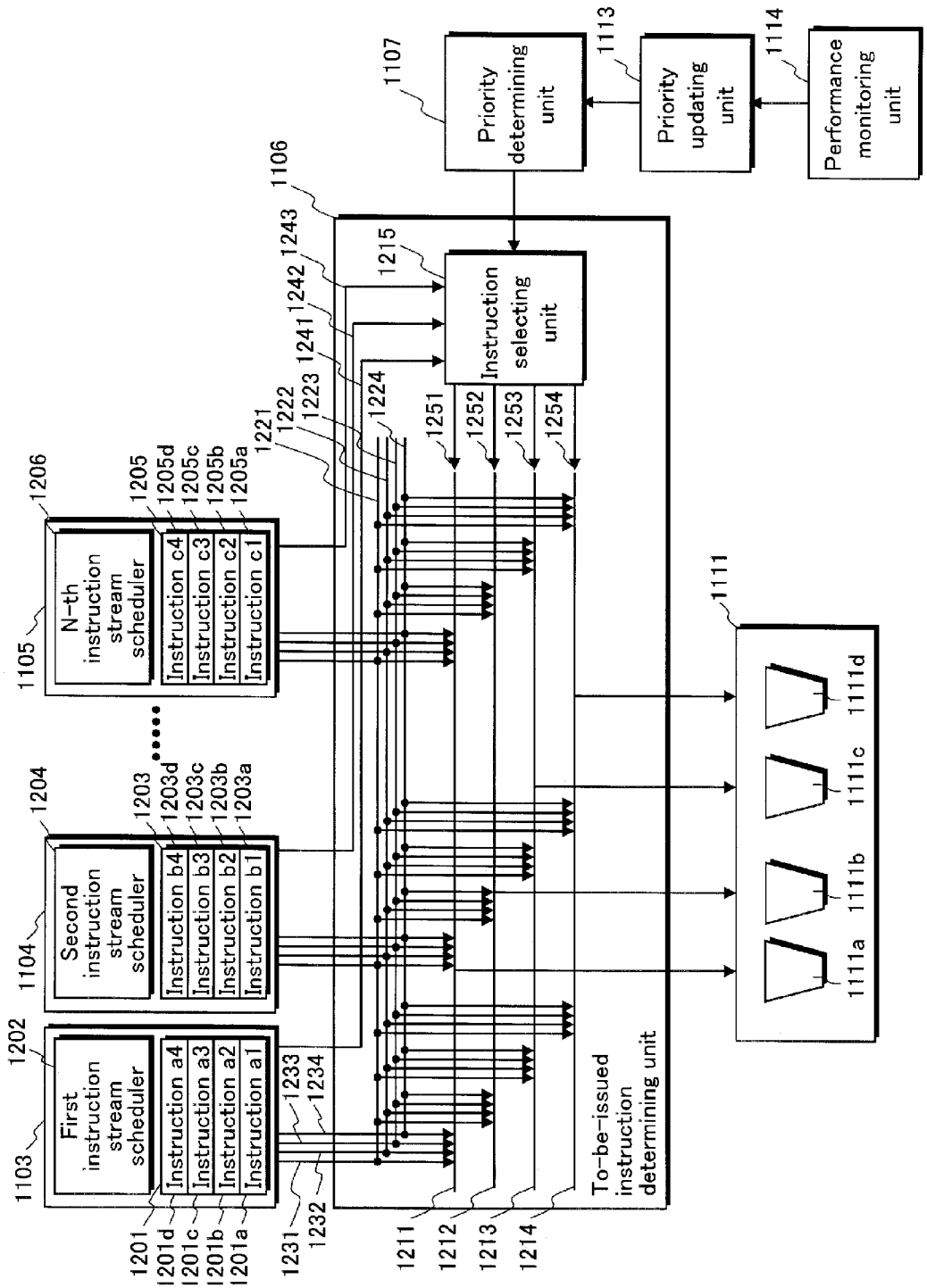
FIG. 14 illustrates the structure of the instruction buffers 1103 to 1105 and the to-be-issued instruction determining unit 1106.

More specifically, as shown in FIG. 14, the first instruction buffer 1103 includes a first instruction holding unit 1201 and a first instruction stream scheduler 1202. Note that the first instruction holding unit 1201 and the first instruction stream scheduler 1202 are similar to the first instruction holding unit 201 and the first instruction stream scheduler 202 in the first embodiment, and description thereof is omitted here.

The second instruction buffer 1104 includes a second instruction holding unit 1203 and a second instruction stream scheduler 1204. The N-th instruction buffer 1105 includes an N-th instruction holding unit 1205 and an N-th instruction stream scheduler 1206. These structural elements are similar to those of the first embodiment, and description thereof is omitted here.

(4) Priority Determining Unit 1107

The priority determining unit 1107 holds a priority information table 1300 which is used by the to-be-issued instruction determining unit 1106 when it determines instructions to be issued.

The priority information table 1300, for example as shown in FIG. 15A, includes priority information 1301, instruction stream information 1302, and instruction number information 1303. The priority information table 1300 includes 4×N table elements associated one-to-one with a total of 4×N storage areas provided in the N instruction buffers. The priority information 1301, instruction stream information 1302, and instruction number information 1303 are similar to the priority information 301, instruction stream information 302, and instruction number information 303, and description thereof is omitted here.

It is presumed here that the priority information table 1300 in the initialized state indicates the priorities of the instructions (priorities in issuance of the instructions) that are set by the method explained in the first embodiment.

(5) Performance Monitoring Unit 1114

The performance monitoring unit 1114 includes N executed instruction counters and a cycle counter. The executed instruction counters are associated one-to-one with the N instruction streams, and the executed instruction counter of each instruction stream counts down the number of instructions of the instruction stream each time an instruction of the instruction stream is executed. The cycle counter counts down the number of machine cycles of the processor 10b.

Each of the N executed instruction counters counts down the number of instructions of a corresponding instruction stream each time an instruction of the instruction stream is executed on the processor 10b. Note that, at the start of operation, an initial value is set in each of the N executed instruction counters.

If any counter value of the N executed instruction counters becomes "0", the performance monitoring unit 1114 informs the priority updating unit 1113 that the counter value has become "0". The information sent from the performance monitoring unit 1114 to the priority updating unit 1113 for this purpose (hereinafter, the information is referred to as "first notification information") includes an identifier (instruction stream ID) identifying an instruction stream corresponding to an executed instruction counter whose counter value has become "0".

The cycle counter counts down the number of machine cycles each time the machine cycle of the processor 10b elapses. If the counter value becomes "0", the performance monitoring unit 1114 initializes the cycle counter to an initial value that is stored in an initial value register. Also, the performance monitoring unit 1114 initializes the N executed instruction counters to respective initial values that are stored in initial value registers.

Note that, as described above, the initial values stored in initial value registers are used to initialize the counters. The values to be stored in the initial value registers are determined based on the system structure that specifies what types of and how many pieces of software are executed on the processor, are defined by the system designer, and are written by the system control software.

If the counter value of the cycle counter becomes "0", the performance monitoring unit 1114 informs the priority updating unit 1113 that the counter value has become "0". Hereinafter, the notification that the counter value of the cycle counter has become "0" is referred to as "second notification information". After sending the second notification information to the priority updating unit 1113, the performance monitoring unit 1114 initializes the cycle counter to the initial value.

(6) Priority Updating Unit 1113

The priority updating unit 1113 updates the priority information table 800 held by the priority determining unit 607, under a predetermined condition.

Upon receiving the first notification information, the priority updating unit 1113 updates the priorities in the entries of the priority information table. For example, if any counter value of the N executed instruction counters becomes "0", the priority updating unit 1113 receives, from the performance monitoring unit 1114, the first notification information indicating that a counter value has become "0" and including an instruction stream ID, and updates the priority information table 1300 so that the priority of the instruction stream identified by the received instruction stream ID becomes the lowest.

Also, upon receiving the second notification information, the priority updating unit 1113 updates the priorities in the entries of the priority information table to the initial values. For example, if the counter value of the cycle counter becomes "0", the priority updating unit 1113 receives the second notification information from the performance monitoring unit 1114, and updates the priorities in the entries of the priority information table to the initial values.

FIG. 15B illustrates priority information table 1300a as an example of a result of updating the priority information table 1300. In this example, only the first and second instruction streams are executed. Also, the result in this example is obtained when the priority updating unit 1113 receives, from the performance monitoring unit 1114, the first notification information indicating that the instruction stream corresponding to an executed instruction counter whose counter value has become "0" is the first instruction stream.

In this example, the priority updating unit 1113 updates the priority information table 1300 so that the priority of the first instruction stream becomes the lowest, that is to say, so that the instructions belonging to the second instruction stream are issued with priority.

As a result, the priorities of the second instruction stream indicated in the priority information of entries 1305, 1306, and 1307 of the priority information table 1300 before update have been updated to priorities "1" to "3", shifted up by one, in entries of the priority information 1309, 1310, and 1311 of the priority information table 1300a after update. Also, priority "1" of the first instruction stream indicated in the priority information of entry 1304 of the priority information table 1300 before update has been updated to priority "4" in the priority information of entry 1312 of the priority information table 1300a after update.

The following explains the structural elements with reference to the priority information table 1300.

(7) To-Be-Issued Instruction Determining Unit 1106

The to-be-issued instruction determining unit 1106 determines instructions to be issued in each machine cycle from among the instructions stored in the first instruction buffer 1103 to the N-th instruction buffer 1105.

The to-be-issued instruction determining unit 1106 selects four instructions from among the instructions that are in the executable state and stored in the storage areas, in accordance with the order indicated by the priority information table 1300, based on the first instruction stream scheduler 1202 to the N-th instruction stream scheduler 1206 and the priority information table 1300, and outputs the selected instructions to the respective computing units.

The following explains the hardware structure of the to-be-issued instruction determining unit 1106 with reference to FIG. 14.

The to-be-issued instruction determining unit 1106 includes a first instruction determining unit 1211 to a fourth instruction determining unit 1214, an instruction selecting unit 1215, and a first instruction extracting unit 1221 to a fourth instruction extracting unit 1224.

(7-1) Instruction Selecting Unit 1215

The instruction selecting unit 1215 is similar to the instruction selecting unit 215 described in the first embodiment. More specifically, the instruction selecting unit 1215 receives, from the first instruction buffer 1103 to the N-th instruction buffer 1105, signals indicating the number of issuable instructions in each of the instruction buffer. That is to say, the instruction selecting unit 1215 receives signals 1241 to 1243 each indicating the number of instructions that are in the executable state, and identifies the four instructions to be selected, in accordance with the order indicated by the priority information table 1300.

The instruction selecting unit 1215 outputs, to the first instruction determining unit 1211 through the fourth instruction determining unit 1214, to-be-issued instruction select signals 1251 through 1254 that indicate instructions to be obtained by the respective instruction determining units. Each of the to-be-issued instruction select signals includes information indicating an instruction to be extracted. For example, the information indicates an instruction buffer and a storage area in which the instruction to be extracted is stored.

(7-2) First Instruction Extracting Unit 1221 to Fourth Instruction Extracting Unit 1224

The first instruction extracting unit 1221 to fourth instruction extracting unit 1224 are similar to the first instruction extracting unit 221 to fourth instruction extracting unit 224 described in the first embodiment, and description thereof is omitted here.

(7-3) First Instruction Determining Unit 1211 to Fourth Instruction Determining Unit 1214

The first instruction determining unit 1211 to the fourth instruction determining unit 1214 are associated one-to-one with computing units included in the computing unit group 1111 and their functions are similar to those of the first instruction determining unit 211 to the fourth instruction determining unit 214 described in the first embodiment, and description thereof is omitted here.

(8) First Register File 1108 to N-th Register File 1110

The first register file 1108 to N-th register file 1110 are similar to the first register file 108 to N-th register file 110 described in the first embodiment, and description thereof is omitted here.

(9) Computing Unit Group 1111

The computing unit group 1111 includes a plurality of computing units each of which is an adder, multiplier or the like. In this example, the computing unit group 1111 includes four computing units (a computing unit 1111a to a computing unit 1111d). Also, the computing unit 1111a is associated with the first instruction determining unit 1211, the computing unit 1111b with the second instruction determining unit 1212, the computing unit 1111c with the third instruction determining unit 1213, and the computing unit 1111d with the fourth instruction determining unit 1214.

Each instruction processed by the computing units includes information identifying an instruction stream to which the instruction belongs. The computing units output computation results to corresponding register files, based on the information included in each instruction.

(10) Write-Back Bus 1112

The write-back bus 1112 is a bus for writing output data from the computing unit group 1111 back to the first register file 1108 to the N-th register file 1110.

3.2 Operation (1) Operation for Determining Instruction to be Issued

Figure 16:
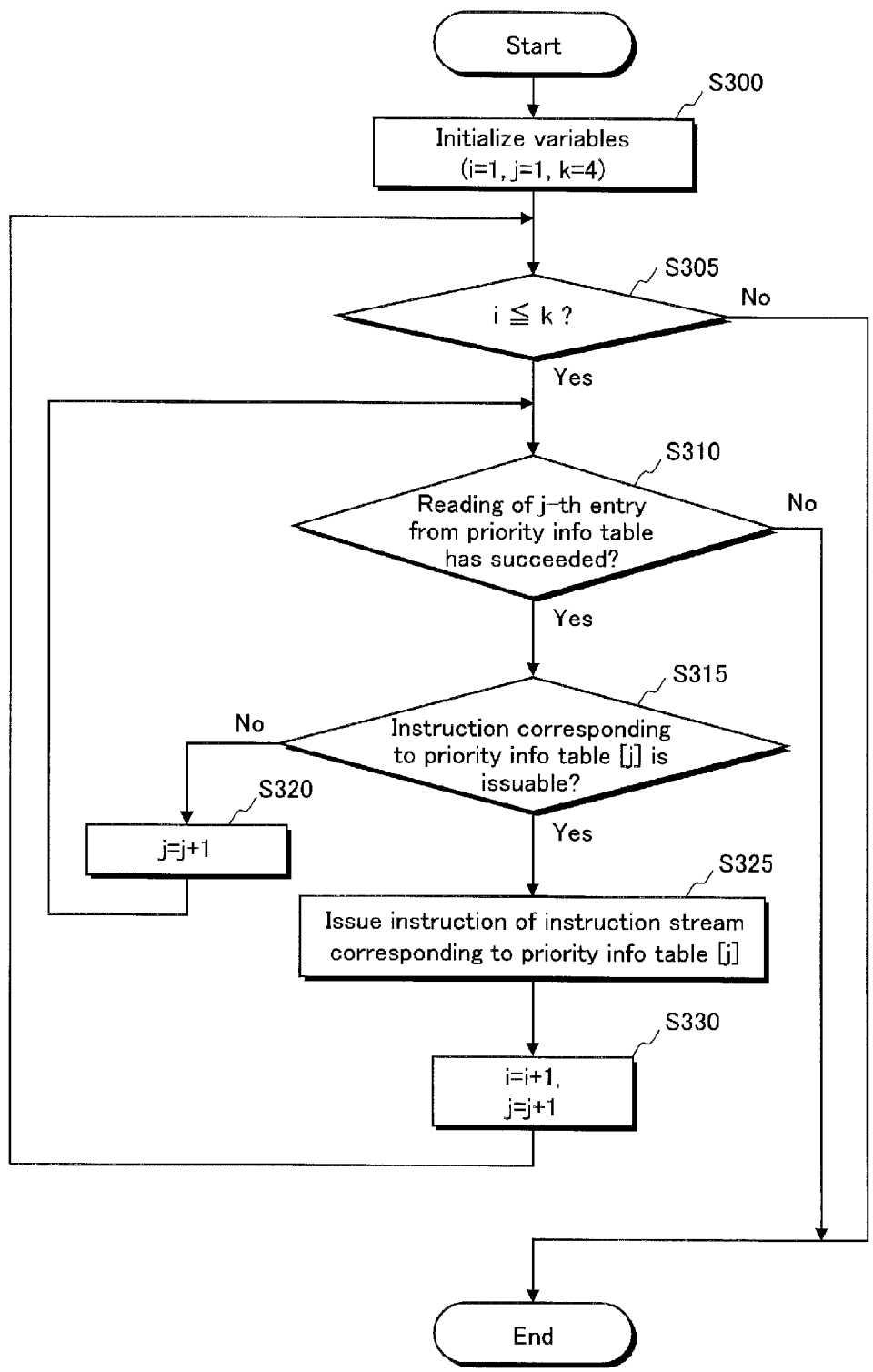
FIG. 16 is a flowchart illustrating the operation for determining instructions to be issued in the third embodiment.

The following explains the operation for determining instructions to be issued, with reference to a flowchart shown in FIG. 16. In the following explanation, it is presumed for convenience's sake that the priority information table used in the operation is the priority information table 1300. Note that the processing operation is the same if the updated priority information table 1300a is used. The instruction selecting unit 1215 initializes variables (i=1; j=1; k=4) when determining instructions to be issued in a machine cycle (step S300). Note that a variable "i" is a counter that counts the instructions issued in each machine cycle; a variable "j" is a pointer that points to information to be read from the priority information table 1300; and a variable "k" indicates the maximum number of instructions that can be issued in a machine cycle, which is "4" in the present embodiment.

The instruction selecting unit 1215 judges whether or not the variable "i" is equal to or smaller than the variable "k", namely whether or not the number of instructions to be issued is equal to or smaller than the maximum number (step S305).

If the instruction selecting unit 1215 judges that the variable "i" is equal to or smaller than the variable "k" ("Yes" in step S305), the instruction selecting unit 1215 attempts to read the j-th entry from the priority information table 1300, and judges whether or not the reading has succeeded (step S310).

If the instruction selecting unit 1215 judges that reading the j-th entry has succeeded ("Yes" in step S310), the instruction selecting unit 1215 judges whether or not an instruction of an instruction stream indicated by the obtained j-th entry is issuable (step S315).

If the instruction selecting unit 1215 judges that the instruction is not issuable ("No" in step S315), a value "1" is added to the variable "j" (step S320), and the control returns to step S310.

If the instruction selecting unit 1215 judges that the instruction is issuable ("Yes" in step S315), the instruction selecting unit 1215 outputs a to-be-issued instruction select signal to the i-th instruction determining unit. Upon receiving the to-be-issued instruction select signal, the i-th instruction determining unit causes an instruction extracting unit, which corresponds to the storage area in which the instruction to be issued is stored, to extract the instruction, and outputs the instruction extracted by the instruction extracting unit to a corresponding computing unit (step S325).

Subsequently, a value "1" is added to each of the variable "i" and variable "j" (step S330), and the control returns to step S305.

If the instruction selecting unit 1215 judges that the variable "i" is greater than the variable "k" ("No" in step S305), or if it judges that reading the j-th entry has failed, namely, if there is no entry at a position pointed to by the pointer ("No" in step S310), the processing ends.

(2) Operation for Updating Priority Information Table

The following explains an update process using the executed instruction counters (hereinafter referred to as "first update process") and an update process using the cycle counter (hereinafter referred to as "second update process").

(2-1) First Update Process

Figure 17:
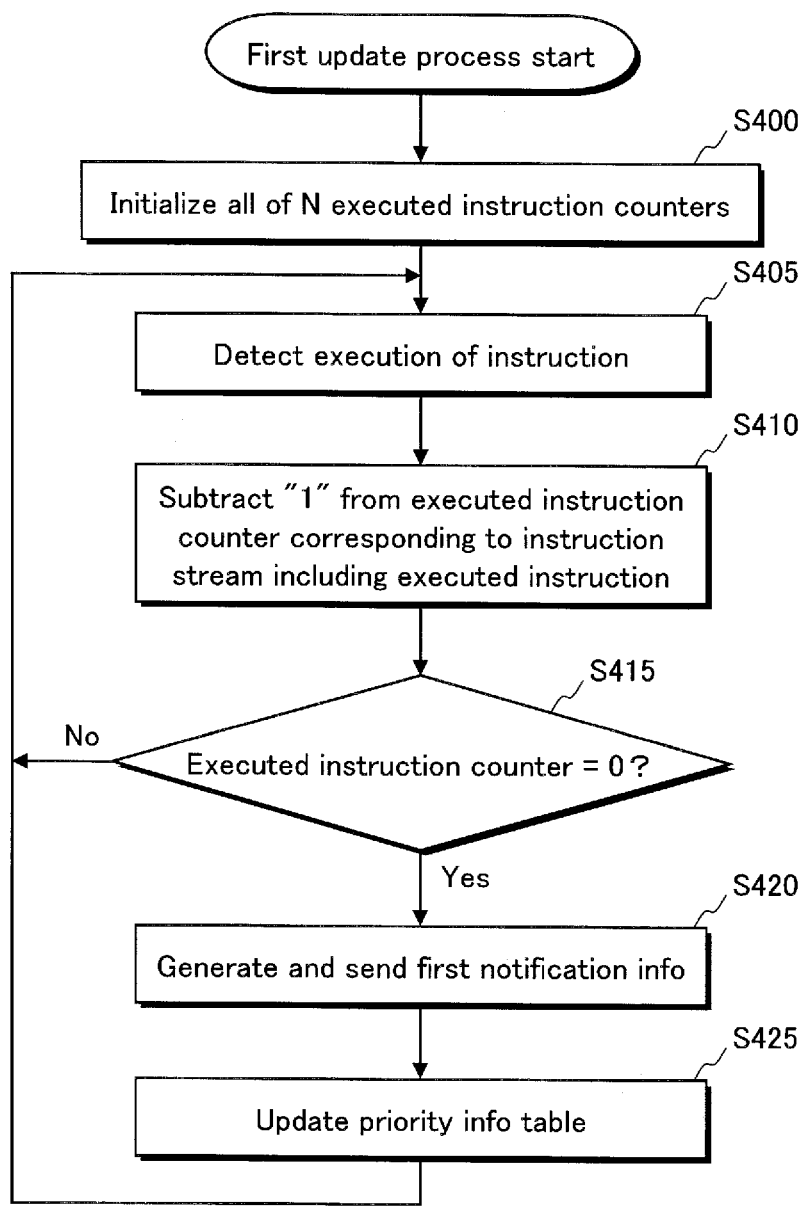
FIG. 17 is a flowchart illustrating the operation of the first update process for updating the priority information table 1300.

First, the first update process will be explained with reference to a flowchart shown in FIG. 17.

The performance monitoring unit 1114 initializes all of the N executed instruction counters at the start of operation (step S400).

The performance monitoring unit 1114 detects an execution of an instruction (step S405), and subtracts "1" from the value of an executed instruction counter that corresponds to an instruction stream including the executed instruction (step S410).

The performance monitoring unit 1114 then judges whether or not the value of the executed instruction counter from which value "1" was subtracted is "0" (step S415).

If it judges that the value of the executed instruction counter from which value "1" was subtracted is "0" ("Yes" in step S415), the performance monitoring unit 1114 generates the first notification information, and sends the first notification information to the priority updating unit 1113 (step S420). In this example, the generated first notification information includes an instruction stream ID identifying an instruction stream corresponding to an executed instruction counter whose counter value has become "0".

Upon receiving the first notification information from the performance monitoring unit 1114, the priority updating unit 1113 updates the priority information table 1300 so that the priority of the instruction stream identified by the instruction stream ID included in the received first notification information becomes the lowest (step S425).

After the priority updating unit 1113 updates the priority information table 1300, or if it judges that the value of the executed instruction counter from which value "1" was subtracted is not "0" ("No" in step S415), the control returns to step S405.

(2-2) Second Update Process

Figure 18:
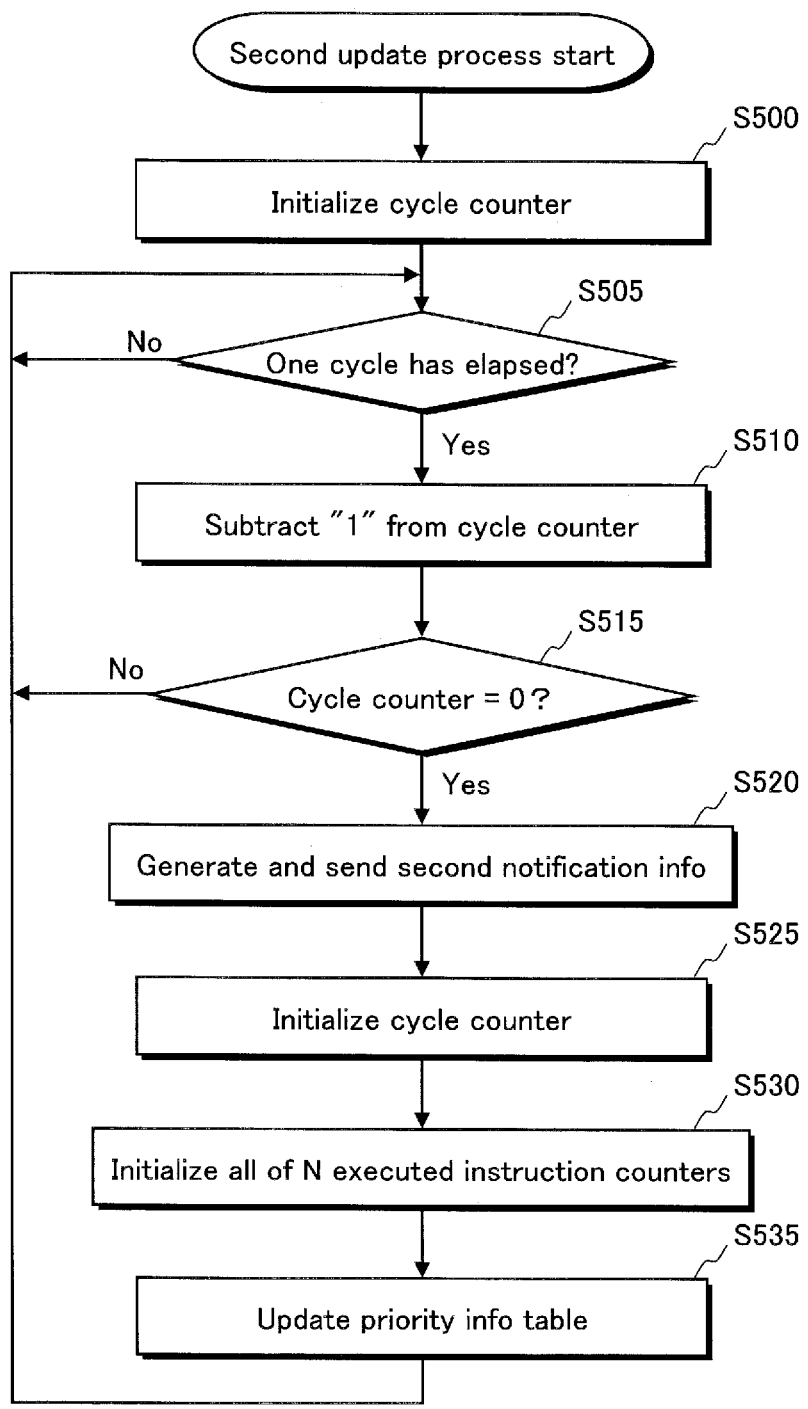
FIG. 18 is a flowchart illustrating the operation of the second update process for updating the priority information table 1300.

Next, the second update process will be explained with reference to a flowchart shown in FIG. 18.

The performance monitoring unit 1114 initializes the cycle counter at the start of operation (step S500).

The performance monitoring unit 1114 then judges whether or not one cycle of processing time has elapsed (step S505).

If it judges that one cycle of processing time has elapsed ("Yes" in step S505), the performance monitoring unit 1114 subtracts "1" from the value of the cycle counter (step S510).

The performance monitoring unit 1114 judges whether or not the value of the cycle counter from which value "1" was subtracted is "0" (step S515).

If it judges that the value of the cycle counter from which value "1" was subtracted is "0" ("Yes" in step S515), the performance monitoring unit 1114 generates the second notification information, and sends the second notification information to the priority updating unit 1113 (step S520).

The performance monitoring unit 1114 initializes the cycle counter (step S525), and initializes all of the N executed instruction counters (step S530).

Upon receiving the second notification information from the performance monitoring unit 1114, the priority updating unit 1113 updates the priority information table to the initial state (step S535).

If it is judged that one cycle of processing time has not elapsed after an update of the priority information table ("No" in step S505), or if it is judged that the value of the cycle counter from which value "1" was subtracted is not "0" ("No" in step S515), the control returns to step S505.

3.3 Operation Image

Figure 19:
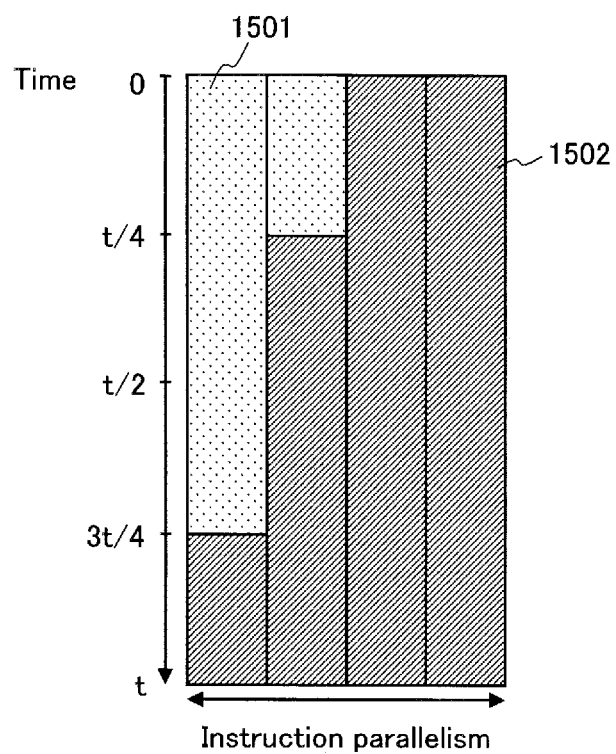
FIG. 19 illustrates an operation image indicating how instructions are assigned (issued) during the parallel processing using the first and second instruction streams in the third embodiment.
Figure 19:
Figure 19:
Figure 20:
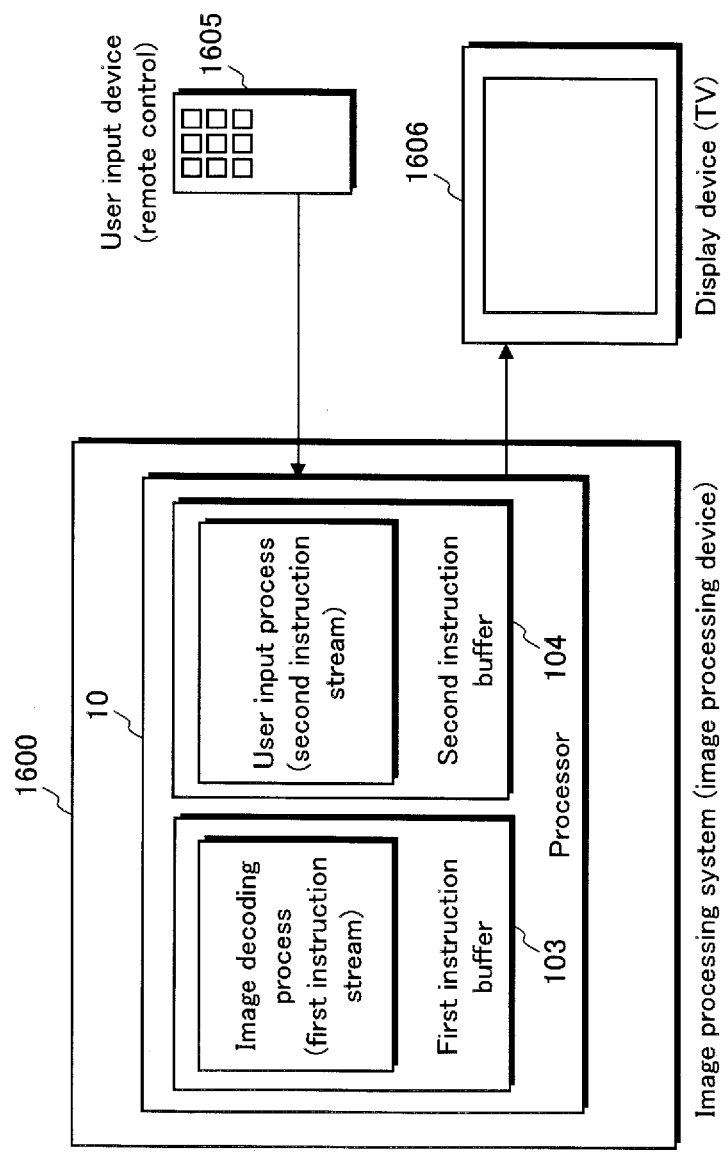
FIG. 20 illustrates an example of the structure of the image processing system 1600.

FIG. 19 illustrates an operation image indicating how instructions are assigned (issued) during the parallel processing using the first and second instruction streams in the third embodiment.

Note that in the operation image illustrated in FIG. 19, the vertical axis represents time, and the horizontal axis represents the instruction parallelism.

Also, it is presumed that the first instruction stream can carry out the process within time period "t" when at least one instruction is issued within the time period "t".

In FIG. 19, a block 1501 indicates how an instruction of the first instruction stream is executed, and indicates that, up to time "t/4", always two instructions are issued, and that one instruction is issued from time "t/4" to time "3t/4".

A block 1502 indicates how instructions of the second instruction stream are executed, and indicates that, up to time "t/4", two instructions are executed. In the priority information table 1300 shown in FIG. 15A, according to the priority order of the highest four instructions, up to three instructions of the second instruction stream are executed with priority. However, of these, an instruction that is not prepared to be issued is replaced with another instruction having the next priority order. For this reason, as shown in FIG. 19, if only two instructions of the second instruction stream are permitted to be executed, two instructions of the first instruction stream are executed.

After this, during a time period between time "t/4" and "3t/4", three instructions of the second instruction stream are executed.

At time "3t/4", the values of the executed instruction counters corresponding to the first instruction stream become "0", for the following reasons. That is to say, for a time period from time "0" to time "t/4", two instructions of the first instruction stream are issued, and thus a total of value "2" is subtracted from the executed instruction counters corresponding to the first instruction stream. Accordingly, compared to the case where one instruction is issued, the process ends earlier before time period "t/4", and the values of the executed instruction counters corresponding to the first instruction stream become "0".

When this happens, at time "3t/4", the priority information table 1300 is updated to, for example, the priority information table 1300a shown in FIG. 15B, and in the subsequent process, always four instructions of the second instruction stream are issued.

When time "t" is reached, the value of the cycle counter becomes "0", the various types of counters are initialized, and the priority information table is updated to the initial state, namely, to the priority information table 1300.

With the above-described structure, an instruction stream that has completed a predetermined process within a predetermined cycle is laid in the state where it does not consume any execution resources of the processor, and other instruction streams can have more chances to be executed.

4. Fourth Embodiment

The following explains an image processing system 1600 in which the processor 10 described in the first embodiment is used.

The image processing system 1600 is, for example, an image processing device that decodes an image signal and outputs the decoding result to a display device (a television or the like).

In this example, the image processing system 1600 includes the processor 10 described in the first embodiment, and carries out one process of decoding an image signal received from outside, and another process based on an instruction from a user input device (remote control) 1605.

Note that, a detailed description of the structure of the processor 10 is omitted here since it is illustrated in FIGS. 1 and 2. In the following description, the structural elements described in the first embodiment are used as necessary.

The processor 10, to decode an image signal having been compressed in compliance with a standard such as "H.264", performs the analysis of a bit stream, the process of decoding a variable-length-encoded signal, the inverse quantization, the inverse frequency transform, the motion compensation, and the deblock filtering process. With regard to these processes, it is necessary to guarantee a predetermined level of performance to prevent the image from being disturbed. However, the processes do not need to have the performance exceeding the predetermined level.

Also, inputs from users via the remote control or the like need to be processed as quickly as possible, namely, the processes need to have the responsiveness.

In view of the above, the present image processing system is structured to carry out, as the first instruction stream described in the first embodiment, the process of decoding the image signal (image decoding process), and, as the second instruction stream, the process instructed by the user input device 1605 (user input process). With this structure, it is possible to build a real-time image processing system that achieves both guaranteeing the performance and high responsiveness on a single multithreaded processor.

This is because, in each parallel processing period of four instructions, always an instruction related to the image decoding process is issued according to the priority order indicated by the priority information table 300, and instructions related to the user input process are assigned to the remaining three computing units that are not used in the image decoding process. With this structure, the present embodiment satisfies the requirement for the image decoding process to guarantee the predetermined level of performance, while immediately executing the instructions of the user input process.

5. Modifications

Up to now, the present invention has been described through various embodiments. However, the present invention is not limited to the embodiments, but includes, for example, the following modifications.

(1) In the above embodiments, the priority information table includes priority information, instruction stream information, and instruction number information. However, the priority information table is not limited to this structure.

The priority information table may not include the instruction number information. In that case, by using an accumulated number of appearances of an identification value of an instruction stream that appears in an item of the instruction stream, the corresponding instruction number can be identified.

(2) In the above embodiments, four instructions can be issued to a group of computing units in a single machine cycle. However, the number of instructions that can be issued in a single machine cycle may be "2" or more, not limited to "4".

(3) In the second embodiment, the priority information table is updated in accordance with an instruction from the software.

However, not limited to this, the priority information table may be updated in accordance with an instruction from the hardware.

In that case, in accordance with an instruction from the hardware, the priority updating unit 1113 updates the priority information table 1300 which, held by the priority determining unit 1107, stores the priority information.

More specifically, the priority updating unit 1113 holds the updated priority information corresponding to the entries of the priority information table 1300 held by the priority determining unit 1107. For example, the priority updating unit 1113, upon receiving an update signal from the hardware, updates a corresponding entry of the priority information table 1300 based on the received update signal. Also, the instruction from the hardware is preliminarily set so that, for example, the instruction is issued when it is detected that a predetermined instruction was issued (executed on the program).

Note that a plurality of entries may be updated all at once in accordance with an instruction from the hardware.

(4) In the fourth embodiment, the image processing system 1600 decodes an image signal.

However, not limited to this, the image processing system 1600 may encode an image signal.

This structure is realized, for example, when the first instruction buffer holds an instruction pertaining to the process of encoding the image signal, the second instruction buffer holds an instruction pertaining to the user input process, and the instructions held by the instruction buffers are executed in accordance with the priority order indicated by the priority information table.

Also, devices for decoding or encoding an image signal include a DVD recorder, a digital television and the like. That is to say, the image processing system 1600 may be a device that carries out the media processing of video and/or audio.

(5) In the fourth embodiment, the processor 10 described in the first embodiment is used in the image processing system 1600.

However, not limited to this, the processor 10a described in the second embodiment or the processor 10b described in the third embodiment may be used in the image processing system 1600.

(6) The processor 10a described in the second embodiment and the processor 10b described in the third embodiment may incorporate the FPGA (Field Programmable Gate Array), and may update the priority information table by using the functions of the FPGA.

(7) In the above embodiments, the number of storage areas provided in the instruction holding units of each instruction buffer is the same as the number of computing units.

However, not limited to this, the number of storage areas provided in the instruction holding units of each instruction buffer may be smaller or greater than the number of computing units.

Alternatively, when the number of instruction streams, namely, the number of instruction buffers is represented by, for example, "M", and Z storage areas are provided in each instruction buffer, the total number of storage areas (M×Z) may be greater than the number of computing units. In this case, for example, the to-be-issued instruction determining unit 106 obtains as many instructions as the computing units from the (M×Z) storage areas in accordance with the priority order.

(8) The first embodiment explains a case where the first instruction stream completes a process within a predetermined time period if one instruction is issued in each machine cycle.

However, not limited to this, it may be set that the first instruction stream completes a process within a predetermined time period if an opportunity of issuing one instruction in each machine cycle is guaranteed.

Similarly, in the second embodiment, it may be set that the first instruction stream completes a process within a predetermined time period if an opportunity of issuing one instruction in each machine cycle is guaranteed.

Furthermore, in the third embodiment, it may be set that the first instruction stream completes a process within a predetermined time period if an opportunity of issuing one instruction in each machine cycle is guaranteed. In this case, each of the N executed instruction counters provided in the performance monitoring unit 1114 counts down the number of instructions of a corresponding instruction stream each time an instruction of the instruction stream is executed on the processor 10b. Also, even when an instruction was not issued, the number of instructions of a corresponding instruction stream is counted down in a cycle in which the highest priority is assigned to the corresponding instruction stream. Note that, as in the third embodiment, at the start of operation, an initial value is set in each of the N executed instruction counters.

(9) A program, in which the procedure of the method explained in the above embodiments or modifications is described, may be stored in a memory so that the method is realized when the CPU (Central Processing Unit) or the like reads the program from the memory and executes the program.

(10) A program, in which the procedure of the method explained in the above embodiments or modifications is described, may be stored in a recording medium and distributed with the recording medium.

(11) The present invention may be any combination of the above-described embodiments and modifications.

6. Supplementary Notes (1) According to one aspect of the present invention, there is provided a processor including L computing units, L being an integer of 2 or greater, the processor comprising: an instruction buffer including M×Z instruction storage areas each storing one instruction, M instruction streams being input in a state of being distinguished from each other, each of the M instruction streams including Z instructions, M being an integer of 2 or greater, Z being an integer of 2 or greater, M×Z being equal to or greater than L; an order information holding unit holding order information that indicates an order of the M×Z instruction storage areas of the instruction buffer; an extraction unit operable to extract instructions from the M×Z instruction storage areas of the instruction buffer; and a control unit operable to cause the extraction unit to extract L instructions in executable state from the M×Z instruction storage areas in accordance with the order indicated by the order information held by the order information holding unit, and input the extracted L instructions into different ones of the L computing units.

With the above structure in which the processor extracts L executable instructions from the M×Z instruction storage areas in accordance with the order information indicating the order of the M×Z instruction storage areas, it is possible to extract one or more instructions belonging to one instruction stream and one or more instructions belonging to another instruction stream simultaneously. Thus, when, for example, one instruction stream is a performance-guarantee instruction stream whose performance needs to be guaranteed and another instruction stream is a non-performance-guarantee instruction stream whose performance does not need to be guaranteed, execution of instructions of the other instruction stream does not need to wait until execution of instructions of the one instruction stream is completed. Accordingly, the processor of the present invention realizes both guaranteeing the performance of one instruction stream and providing another instruction stream with high responsiveness.

(2) In the above processor, the instruction buffer may include M×Z flags that correspond one-to-one to the M×Z instruction storage areas and each indicate whether or not an instruction stored in a corresponding instruction storage area is executable, and the control unit recognizes all instructions that are in executable state by referring to the M×Z flags.

With the above structure, the processor manages the M×Z instruction storage areas by using the M×Z flags that each indicate whether or not an instruction stored in a corresponding one of the M×Z instruction storage areas is in executable state, and thus easily recognizes all instructions that are in executable state.

(3) In the above processor, one of the M instruction streams may be a performance-guarantee instruction stream that is required to guarantee completing a process within a predetermined time period, and the order information is information assigning L or less positions in the order to L or less instructions of the performance-guarantee instruction stream in each set of L instructions in the order in correspondence with a minimum number of instructions of the performance-guarantee instruction stream that are required to guarantee completing the process within the predetermined time period.

With the above structure in which L or less positions in the order are assigned to L or less instructions of the performance-guarantee instruction stream in each set of L instructions in the order in correspondence with a minimum number of instructions of the performance-guarantee instruction stream that are required to guarantee completing the process within the predetermined time period, the processor always executes the minimum number of instructions, and thus does not cause a processing failure that a process is not completed within the predetermined time period.

(4) In the above processor, the performance-guarantee instruction stream may carry out a process of decoding an image, and the processor is provided in an image processing system for carrying out the process of decoding the image.

With the above structure, the processor realizes both the image decoding process whose performance is required to be guaranteed and providing another instruction stream with high responsiveness.

(5) In the above processor, the performance-guarantee instruction stream may carry out a process of encoding an image, and the processor is provided in an image processing system for carrying out the process of encoding the image.

With the above structure, the processor realizes both the image encoding process whose performance is required to be guaranteed and providing another instruction stream with high responsiveness.

(6) The above processor may further comprise: an order information update unit operable to monitor, for each of the M instruction streams, the number of instructions having been output to a computing unit, and if the number of instructions having been output from an instruction stream exceeds a predetermined number, update the order information to shift down Z instruction storage areas storing Z instructions of the instruction stream in the order.

With the above structure, if the number of instructions having been issued from an instruction stream exceeds a predetermined number, the processor shifts down Z instruction storage areas that store Z instructions of the instruction stream. This gives priority to another instruction stream to issue one or more instructions. Accordingly, for example, when the instructions of an instruction stream are completed and there is no need to execute instructions of the instruction stream with priority, an issuance of instruction is assigned to another instruction stream instead of the instruction stream. This improves the processing efficiency of the other instruction stream.

(7) The above processor may further comprise: an order information update unit operable to monitor, for each of the M instruction streams, instructions having been output to a computing unit, and if a predetermined instruction among instructions of an instruction stream is output, update the order information to shift down Z instruction storage areas storing Z instructions of the instruction stream in the order.

With the above structure, immediately after a predetermined instruction among instructions of an instruction stream is issued, the processor shifts down Z instruction storage areas that store Z instructions of the instruction stream. This gives priority to another instruction stream to issue one or more instructions. Accordingly, for example, when a predetermined instruction is issued from an instruction stream and there is no need to execute instructions of the instruction stream with priority, an issuance of instruction is assigned to another instruction stream instead of the instruction stream. This improves the processing efficiency of the other instruction stream.

INDUSTRIAL APPLICABILITY

The processor of the present invention can be applied to devices that require both guaranteeing the performance of one instruction stream and providing another instruction stream with high responsiveness.

REFERENCE SIGNS LIST

10 processor
101 instruction memory
102 instruction group determining unit
103-105 first to N-th instruction buffers
106 to-be-issued instruction determining unit
107 priority determining unit
108-110 first to N-th register files
111 computing unit group
112 write-back bus
201 first instruction holding unit
201a-201d first to fourth storage areas
202 first instruction stream scheduler
201 second instruction holding unit
204 second instruction stream scheduler
205 N-th instruction holding unit
206 N-th instruction stream scheduler
211-214 first to fourth instruction determining units
215 instruction selecting unit
221-224 first to fourth instruction extracting units
751-754 to-be-issued instruction select signals

The invention claimed is:
1. A processor including L computing units, L being an integer of 2 or greater, the processor comprising:
an instruction buffer including M×Z instruction storage areas each storing one instruction, M instruction streams being input in a state of being distinguished from each other, each of the M instruction streams including Z instructions, M being an integer of 2 or greater, Z being an integer of 2 or greater, M×Z being equal to or greater than L;

an order information holding unit holding M×Z pieces of order information that indicate an order of the M×Z instruction storage areas of the instruction buffer;

an extraction unit operable to extract instructions from the M×Z instruction storage areas of the instruction buffer; and a control unit operable to cause the extraction unit to extract L instructions in executable state from the M×Z instruction storage areas in accordance with the order indicated by the order information held by the order information holding unit, and input the extracted L instructions into different ones of the L computing units.

2. The processor of claim 1, wherein
the instruction buffer includes M×Z flags that correspond one-to-one to the M×Z instruction storage areas and each indicate whether or not an instruction stored in a corresponding instruction storage area is executable, and
the control unit recognizes all instructions that are in executable state by referring to the M×Z flags.

3. The processor of claim 1, wherein
one of the M instruction streams is a performance-guarantee instruction stream that is required to guarantee completing a process within a predetermined time period.

4. The processor of claim 3, wherein
the performance-guarantee instruction stream carries out a process of decoding an image, and
the processor is provided in an image processing system for carrying out the process of decoding the image.

5. The processor of claim 3, wherein
the performance-guarantee instruction stream carries out a process of encoding an image, and
the processor is provided in an image processing system for carrying out the process of encoding the image.

6. The processor of claim 1 further comprising:
an order information update unit operable to monitor, for each of the M instruction streams, the number of instructions having been output to a computing unit, and if the number of instructions having been output from an instruction stream exceeds a predetermined number, update the order information to shift down Z instruction storage areas storing Z instructions of the instruction stream in the order.

7. The processor of claim 1 further comprising:
an order information update unit operable to monitor, for each of the M instruction streams, instructions having been output to a computing unit, and if a predetermined instruction among instructions of an instruction stream is output, update the order information to shift down Z instruction storage areas storing Z instructions of the instruction stream in the order.

8. A method for use in a processor including L computing units, L being an integer of 2 or greater,
the processor comprising:
an instruction buffer including M×Z instruction storage areas each storing one instruction, M instruction streams being input in a state of being distinguished from each other, each of the M instruction streams including Z instructions, M being an integer of 2 or greater, Z being an integer of 2 or greater, M×Z being equal to or greater than L; and
an order information holding unit holding M×Z pieces of order information that indicate an order of the M×Z instruction storage areas of the instruction buffer,
the method comprising the steps of:
extracting instructions from the M×Z instruction storage areas of the instruction buffer; and
causing the extracting step to extract L instructions in executable state from the M×Z instruction storage areas in accordance with the order indicated by the order information held by the order information holding unit, and inputting the extracted L instructions into different ones of the L computing units.

\* \* \* \* \*